US012563531B2

(12) United States Patent
Fakoorian et al.

(10) Patent No.: US 12,563,531 B2
(45) Date of Patent: Feb. 24, 2026

(54) RESOURCE CONFIGURATION AND RESERVATION FOR SIDELINK COMMUNICATIONS

(71) Applicant: QUALCOMM Incorporated, San Diego, CA (US)

(72) Inventors: Seyed Ali Akbar Fakoorian, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 391 days.

(21) Appl. No.: 18/301,067

(22) Filed: Apr. 14, 2023

(65) Prior Publication Data

US 2023/0254821 A1 Aug. 10, 2023

Related U.S. Application Data

(62) Division of application No. 17/081,838, filed on Oct. 27, 2020, now Pat. No. 11,665,671.

(Continued)

(51) Int. Cl.
*H04W 72/02* (2009.01)
*H04B 1/7143* (2011.01)
(Continued)

(52) U.S. Cl.
CPC .......... *H04W 72/02* (2013.01); *H04B 1/7143* (2013.01); *H04L 1/0071* (2013.01);
(Continued)

(58) Field of Classification Search
CPC . H04W 72/02; H04W 28/26; H04W 72/0453; H04W 74/0816; H04W 92/18;
(Continued)

(56) References Cited

U.S. PATENT DOCUMENTS

| | | | | |
|---|---|---|---|---|
| 2007/0097927 A1* | 5/2007 | Gorokhov | ............. | H04L 5/0094 |
| | | | | 370/335 |
| 2017/0280476 A1 | 9/2017 | Yerramalli et al. | | |

(Continued)

FOREIGN PATENT DOCUMENTS

| | | |
|---|---|---|
| CN | 107667565 A | 2/2018 |
| CN | 108029102 A | 5/2018 |

(Continued)

OTHER PUBLICATIONS

International Preliminary Report on Patentability—PCT/US2020/057608 the International Bureau of WIPO—Geneva, Switzerland, May 12, 2022.

(Continued)

*Primary Examiner* — Chae S Lee

(74) *Attorney, Agent, or Firm* — QUALCOMM Incorporated

(57) ABSTRACT

Methods, systems, and devices for wireless communications are described. Generally, the described techniques provide for efficiently selecting resources for sidelink communications in a shared spectrum while allowing other user equipment (UEs) a chance to gain access to the shared spectrum. In one aspect, a UE may transmit sidelink data to another UE in accordance with a frequency hopping pattern to randomize interference and improve throughput. According to some aspects, the first UE may transmit the sidelink data on a first set of interleaved frequency resources in a first time interval and a second, different set of interleaved frequency resources in a second time interval. In another aspect, a UE may rely on feedback from other UEs to determine when reserved resources are released, and the UE may use the released resources for sidelink communications.

26 Claims, 13 Drawing Sheets

Related U.S. Application Data

(60) Provisional application No. 62/929,661, filed on Nov. 1, 2019.

(51) Int. Cl.

| | |
|---|---|
| *H04L 1/00* | (2006.01) |
| *H04L 27/26* | (2006.01) |
| *H04W 28/26* | (2009.01) |
| *H04W 72/0453* | (2023.01) |
| *H04W 74/0816* | (2024.01) |
| *H04W 92/18* | (2009.01) |

(52) U.S. Cl.
CPC ....... *H04L 27/26025* (2021.01); *H04W 28/26* (2013.01); *H04W 72/0453* (2013.01); *H04W 74/0816* (2013.01); *H04W 92/18* (2013.01)

(58) Field of Classification Search
CPC .............. H04W 72/25; H04W 74/0808; H04B 1/7143; H04B 1/713; H04L 1/0071; H04L 27/26025; H04L 27/0006; H04L 5/0041; H04L 5/0044; H04L 5/0012; H04L 5/0055

See application file for complete search history.

(56) References Cited

U.S. PATENT DOCUMENTS

| | | | |
|---|---|---|---|
| 2018/0123744 A1 * | 5/2018 | Nogami | ............. H04W 52/248 |
| 2019/0090126 A1 | 3/2019 | Hayashi et al. | |
| 2021/0136732 A1 | 5/2021 | Fakoorian et al. | |
| 2021/0219268 A1 | 7/2021 | Li et al. | |
| 2022/0015143 A1 | 1/2022 | Tiirola et al. | |

FOREIGN PATENT DOCUMENTS

| | | | | |
|---|---|---|---|---|
| EP | 3352511 A1 * | 7/2018 | ............ | H04W 72/21 |
| WO | 2018186667 A1 | 10/2018 | | |
| WO | 2018203415 A1 | 11/2018 | | |

OTHER PUBLICATIONS

International Search Report and Written Opinion—PCT/US2020/057608—ISA/EPO—Mar. 12, 2021.

Partial International Search Report—PCT/US2020/057608—ISA/EPO—Jan. 19, 2021.

Qualcomm Incorporated: "LTE Device to Device Proximity Services", 3GPP TSG RAN Meeting #66, 3GPP Draft; RP-141894 Status Report for D2D, 3rd Generation Partnership Project (3GPP), Mobile Competence Centre; 650, Route Des Lucioles; F-06921 Sophia-Antipolis Cedex; France, vol. TSG RAN, No. Maui, USA; Dec. 8, 2014-Dec. 11, 2014, Dec. 4, 2014 (Dec. 4, 2014), 38 Pages, XP051648088, 12th-13th page.

* cited by examiner 205-a ⟋ First Resource Set 205-b ⟋ Second Resource Set 205-c ⟋ Third Resource Set

200

410 — SCI/DCI

415 — Sidelink Data

420 — Unused Resources

400

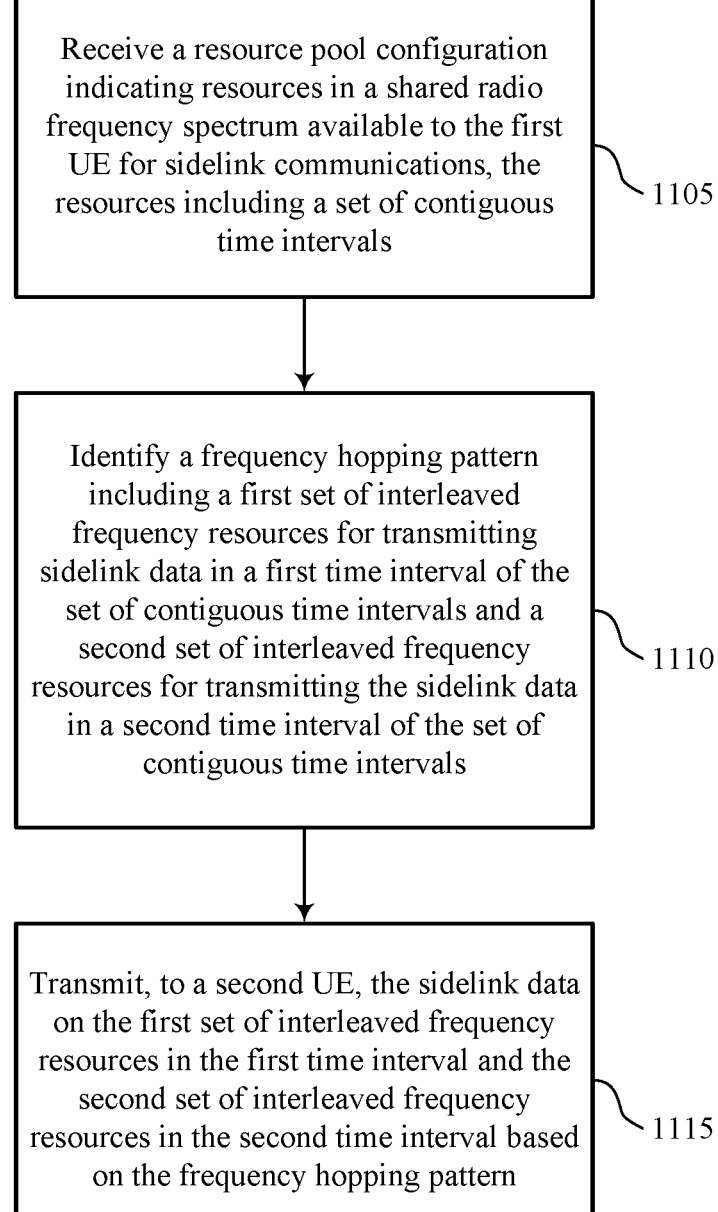

Receive a resource pool configuration indicating resources in a shared radio frequency spectrum available to the first UE for sidelink communications, the resources including a set of contiguous time intervals — 1105

Identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals — 1110

Transmit, to a second UE, the sidelink data on the first set of interleaved frequency resources in the first time interval and the second set of interleaved frequency resources in the second time interval based on the frequency hopping pattern — 1115

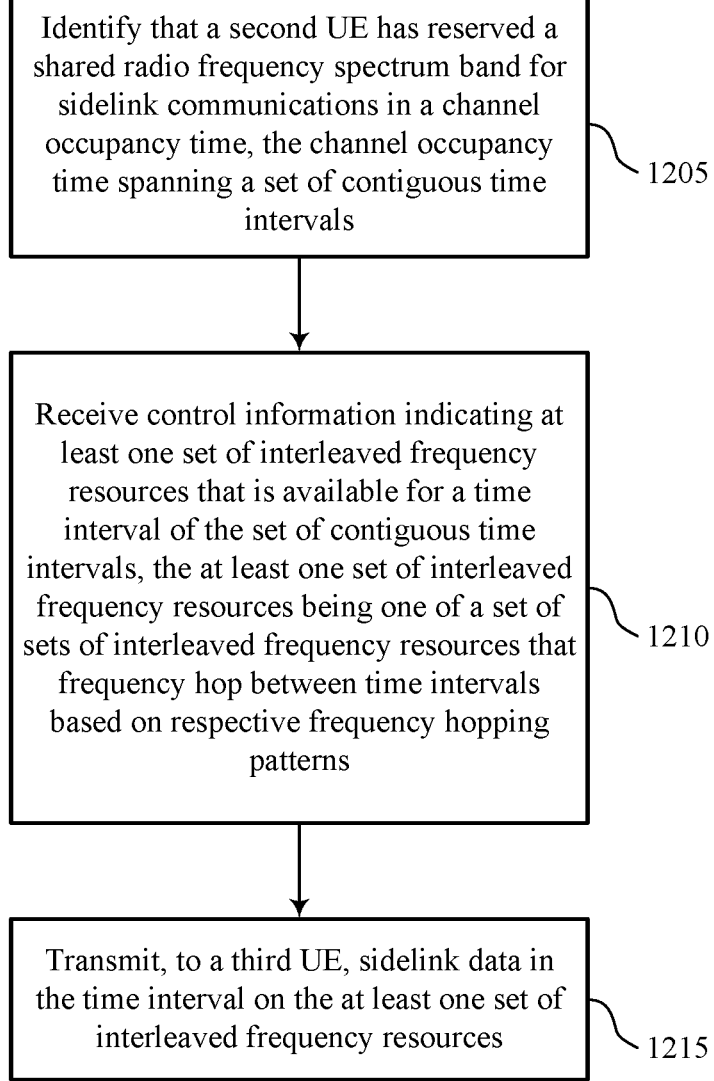

Identify that a second UE has reserved a shared radio frequency spectrum band for sidelink communications in a channel occupancy time, the channel occupancy time spanning a set of contiguous time intervals

1205

Receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns

1210

Transmit, to a third UE, sidelink data in the time interval on the at least one set of interleaved frequency resources

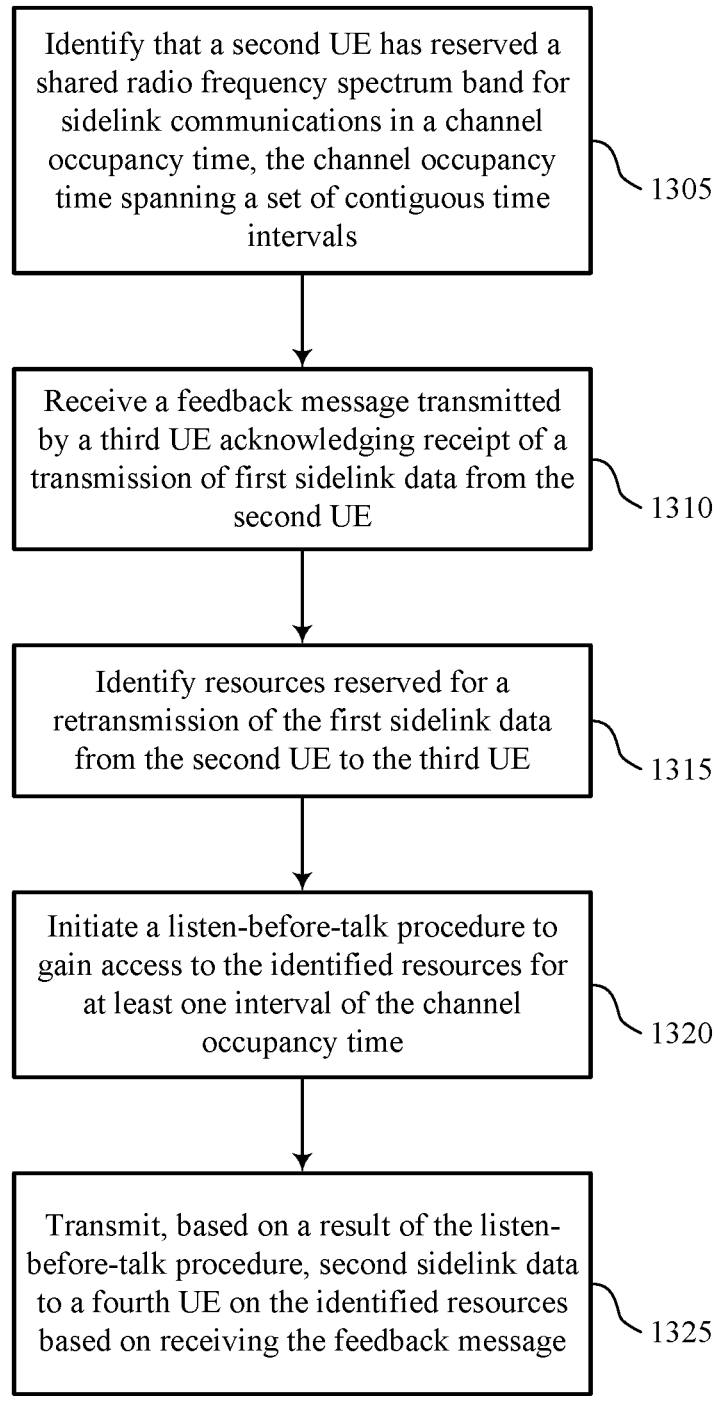

Identify that a second UE has reserved a shared radio frequency spectrum band for sidelink communications in a channel occupancy time, the channel occupancy time spanning a set of contiguous time intervals

1305

Receive a feedback message transmitted by a third UE acknowledging receipt of a transmission of first sidelink data from the second UE

1310

Identify resources reserved for a retransmission of the first sidelink data from the second UE to the third UE

1315

Initiate a listen-before-talk procedure to gain access to the identified resources for at least one interval of the channel occupancy time

1320

Transmit, based on a result of the listen-before-talk procedure, second sidelink data to a fourth UE on the identified resources based on receiving the feedback message

RESOURCE CONFIGURATION AND RESERVATION FOR SIDELINK COMMUNICATIONS

CROSS REFERENCE

The present application for patent is a divisional of U.S. patent application Ser. No. 17/081,838 by FAKOORIAN et al., entitled "RESOURCE CONFIGURATION AND RESERVATION FOR SIDELINK COMMUNICATIONS," filed Oct. 27, 2020, which claims the benefit of U.S. Provisional Patent Application No. 62/929,661 by FAKOORIAN et al., entitled "RESOURCE CONFIGURATION AND RESERVATION FOR SIDELINK COMMUNICATIONS," filed Nov. 1, 2019, each of which is assigned to the assignee hereof, and each of which is expressly incorporated by reference herein.

BACKGROUND

The following relates generally to wireless communications and more specifically to resource configuration and reservation for sidelink communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UEs). Some wireless communications systems may support sidelink communications between UEs over a shared radio frequency spectrum. In such systems, a UE may contend for access to the shared radio frequency spectrum to transmit sidelink data to another UE, and it may be challenging for the UE to gain access to the shared radio frequency spectrum. Improved techniques for facilitating sidelink communications over a shared radio frequency spectrum may be desirable.

SUMMARY

The present disclosure relates to methods, systems, devices, and apparatuses that support resource configuration and reservation for sidelink communications. Generally, the described techniques provide for efficiently selecting resources for sidelink communications in a shared spectrum while allowing other UEs a chance to gain access to the shared spectrum. In one aspect, a UE may transmit sidelink data to another UE in accordance with a frequency hopping pattern to randomize interference and improve throughput. For instance, the UE may transmit the sidelink data on a first set of interleaved frequency resources in a first time interval and a second, different set of interleaved frequency resources in a second time interval. In another aspect, a UE may rely on hybrid automatic repeat request (HARQ) feedback from other UEs to determine when reserved resources are released, and the UE may use the released resources for sidelink communications. For instance, when a first UE receives HARQ feedback indicating that a transmission from a second UE was successfully received by a third UE, the first UE may use resources reserved by the second UE (e.g., for a subsequent retransmission) to transmit sidelink data to a fourth UE.

A method of wireless communication implemented by a first UE is described. The method may include identifying a resource pool configuration indicating resources in a shared radio frequency spectrum band available to the first UE for sidelink communications, the resources comprising a plurality of contiguous time intervals, identifying a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals, and transmitting, to a second UE, the sidelink data on the first set of interleaved frequency resources in the first time interval and the second set of interleaved frequency resources in the second time interval based on the frequency hopping pattern.

An apparatus for wireless communication at a first UE is described. The apparatus may include a processor, memory coupled with the processor, and instructions stored in the memory. The instructions may be executable by the processor to cause the apparatus to identify a resource pool configuration indicating resources in a shared radio frequency spectrum band available to the first UE for sidelink communications, the resources comprising a plurality of contiguous time intervals, identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals, and transmit, to a second UE, the sidelink data on the first set of interleaved frequency resources in the first time interval and the second set of interleaved frequency resources in the second time interval based on the frequency hopping pattern.

Another apparatus for wireless communication at a first UE is described. The apparatus may include means for identifying a resource pool configuration indicating resources in a shared radio frequency spectrum band available to the first UE for sidelink communications, the resources comprising a plurality of contiguous time intervals, identifying a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals, and transmitting, to a second UE, the sidelink data on the first set of interleaved frequency resources in the first time interval and the second set of interleaved frequency resources in the second time interval based on the frequency hopping pattern.

A non-transitory computer-readable medium storing code for wireless communication at a first UE is described. The code may include instructions executable by a processor to identify a resource pool configuration indicating resources in a shared radio frequency spectrum band available to the first UE for sidelink communications, the resources comprising a plurality of contiguous time intervals, identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals, and transmit, to a second UE, the sidelink data on the first set of interleaved frequency resources in the first time interval and the second set of interleaved frequency resources in the second time interval based on the frequency hopping pattern.

Some aspects of the method, apparatuses, and non-transitory computer-readable medium described herein may further include operations, features, means, or instructions for performing a listen-before-talk procedure to gain access to the shared radio frequency spectrum band for a channel occupancy time to transmit the sidelink data to the second UE, the channel occupancy time spanning at least the first time interval and the second time interval of the plurality of contiguous time intervals. Some aspects of the method, apparatuses, and non-transitory computer-readable medium described herein may further include operations, features, means, or instructions for receiving control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

Some aspects of the method, apparatuses, and non-transitory computer-readable medium described herein may further include operations, features, means, or instructions for transmitting, in the first time interval, an indication of the first set of interleaved frequency resources used for transmitting the sidelink data in the first time interval, and transmitting, in the second time interval, an indication of the second set of interleaved frequency resources used for transmitting the sidelink data in the second time interval. Some aspects of the method, apparatuses, and non-transitory computer-readable medium described herein may further include operations, features, means, or instructions for transmitting, in the first time interval, an indication of the second set of interleaved frequency resources used for transmitting the sidelink data in the second time interval. Some aspects of the method, apparatuses, and non-transitory computer-readable medium described herein may further include operations, features, means, or instructions for transmitting, in the first time interval, the second time interval, or both, an indication of the frequency hopping pattern used by the first UE to transmit sidelink data on the first set of interleaved frequency resources in the first time interval and on the second set of interleaved frequency resources in the second time interval.

Some aspects of the method, apparatuses, and non-transitory computer-readable medium described herein may further include operations, features, means, or instructions for transmitting an indication of gaps in the first time interval, the second time interval, or both, allocated for other UEs to perform listen-before-talk procedures to gain access to the shared radio frequency spectrum band. In some aspects of the method, apparatuses, and non-transitory computer-readable medium described herein, respective sets of interleaved frequency resources available to the first UE for sidelink communications in each time interval of the set of contiguous time intervals may be based on a subcarrier spacing of the time interval, a sidelink identification (ID) of the first UE, a resource pool ID of the respective set of interleaved frequency resources, one or more parameters associated with group hopping of frequency resources, or a combination thereof.

A method of wireless communication implemented by a first UE is described. The method may include identifying that a second UE has reserved a shared radio frequency spectrum band for sidelink communications in a channel occupancy time, the channel occupancy time spanning a set of contiguous time intervals, receiving a feedback message transmitted by a third UE acknowledging receipt of a transmission of first sidelink data from the second UE, identifying resources reserved for a retransmission of the first sidelink data from the second UE to the third UE, initiating a listen-before-talk procedure to gain access to the identified resources for at least one interval of the channel occupancy time, and transmitting, based on a result of the listen-before-talk procedure, second sidelink data to a fourth UE on the identified resources based on receiving the feedback message.

An apparatus for wireless communication at a first UE is described. The apparatus may include a processor, memory coupled with the processor, and instructions stored in the memory. The instructions may be executable by the processor to cause the apparatus to identify that a second UE has reserved a shared radio frequency spectrum band for sidelink communications in a channel occupancy time, the channel occupancy time spanning a set of contiguous time intervals, receive a feedback message transmitted by a third UE acknowledging receipt of a transmission of first sidelink data from the second UE, identify resources reserved for a retransmission of the first sidelink data from the second UE to the third UE, initiate a listen-before-talk procedure to gain access to the identified resources for at least one interval of the channel occupancy time, and transmit, based on a result of the listen-before-talk procedure, second sidelink data to a fourth UE on the identified resources based on receiving the feedback message.

Another apparatus for wireless communication at a first UE is described. The apparatus may include means for identifying that a second UE has reserved a shared radio frequency spectrum band for sidelink communications in a channel occupancy time, the channel occupancy time spanning a set of contiguous time intervals, receiving a feedback message transmitted by a third UE acknowledging receipt of a transmission of first sidelink data from the second UE, identifying resources reserved for a retransmission of the first sidelink data from the second UE to the third UE, initiating a listen-before-talk procedure to gain access to the identified resources for at least one interval of the channel occupancy time, and transmitting, based on a result of the listen-before-talk procedure, second sidelink data to a fourth UE on the identified resources based on receiving the feedback message.

A non-transitory computer-readable medium storing code for wireless communication at a first UE is described. The code may include instructions executable by a processor to identify that a second UE has reserved a shared radio frequency spectrum band for sidelink communications in a channel occupancy time, the channel occupancy time spanning a set of contiguous time intervals, receive a feedback message transmitted by a third UE acknowledging receipt of a transmission of first sidelink data from the second UE, identify resources reserved for a retransmission of the first sidelink data from the second UE to the third UE, initiate a listen-before-talk procedure to gain access to the identified resources for at least one interval of the channel occupancy time, and transmit, based on a result of the listen-before-talk procedure, second sidelink data to a fourth UE on the identified resources based on receiving the feedback message.

Some aspects of the method, apparatuses, and non-transitory computer-readable medium described herein may further include operations, features, means, or instructions for receiving control information indicating that the resources reserved for the retransmission may be released upon the third UE acknowledging receipt of the transmission of the first sidelink data. In some aspects of the method, apparatuses, and non-transitory computer-readable medium described herein, the control information further indicates a quantity of slots after receiving the feedback message that the first UE may be to wait before transmitting the second sidelink data on the resources reserved for the retransmission. In some aspects of the method, apparatuses, and non-transitory computer-readable medium described herein, the control information further indicates that the first UE may be eligible to transmit using the identified resources for the at least one interval of the channel occupancy time. In some aspects of the method, apparatuses, and non-transitory computer-readable medium described herein, the control information includes sidelink control information or downlink control information.

BRIEF DESCRIPTION OF THE DRAWINGS

FIGS. 11 through 13 show flowcharts illustrating methods that support resource configuration and reservation for sidelink communications in accordance with aspects of the present disclosure.

DETAILED DESCRIPTION

Some wireless communications systems may support sidelink communications between user equipment (UEs) in a shared spectrum. In such systems, a pool of resources (e.g., a time and frequency resource pool (TFRP)) may be configured for sidelink communications in the shared spectrum, and a UE may perform a listen-before-talk (LBT) procedure to gain access to the resources for a sidelink transmission to another UE. In some cases, a wide range of categories of sidelink communications may be supported (e.g., for internet of things (IoT) applications, vehicle-to-everything (V2X) communications, etc.), and the number of UEs attempting to gain access to the TFRP in the shared spectrum may be high. In such cases, techniques for improving the quality of sidelink transmissions may be desirable to limit the number of times a UE has to acquire or reacquire access to the shared spectrum to transmit or retransmit sidelink data. In addition, techniques for releasing reserved, unused resources may be desirable to allow more UEs to gain access to the shared spectrum.

As described herein, UEs in a wireless communications system may support techniques for efficiently selecting resources for sidelink communications in a shared spectrum while allowing other UEs a chance to gain access to the shared spectrum. In one aspect, a UE may transmit sidelink data to another UE in accordance with a frequency hopping pattern to randomize interference and improve throughput. As a result, an original transmission from the UE may be likely to be received successfully, and the UE may avoid reacquiring access to the shared spectrum for a retransmission. In another aspect, a UE may rely on hybrid automatic repeat request (HARQ) feedback from other UEs to determine when reserved resources are released, and the UE may use the released resources for sidelink communications. For instance, when a first UE receives HARQ feedback indicating that a transmission from a second UE was successfully received by a third UE, the first UE may use resources reserved by the second UE (e.g., for a subsequent retransmission) to transmit sidelink data to a fourth UE (e.g., the second UE may release the reserved, unused resources).

Aspects of the disclosure introduced above are described below in the context of a wireless communications system. Aspects of processes and signaling exchanges that support resource configuration and reservation for sidelink communications are then described. Aspects of the disclosure are further illustrated by and described with reference to apparatus diagrams, system diagrams, and flowcharts that relate to resource configuration and reservation for sidelink communications.

Figure 1:
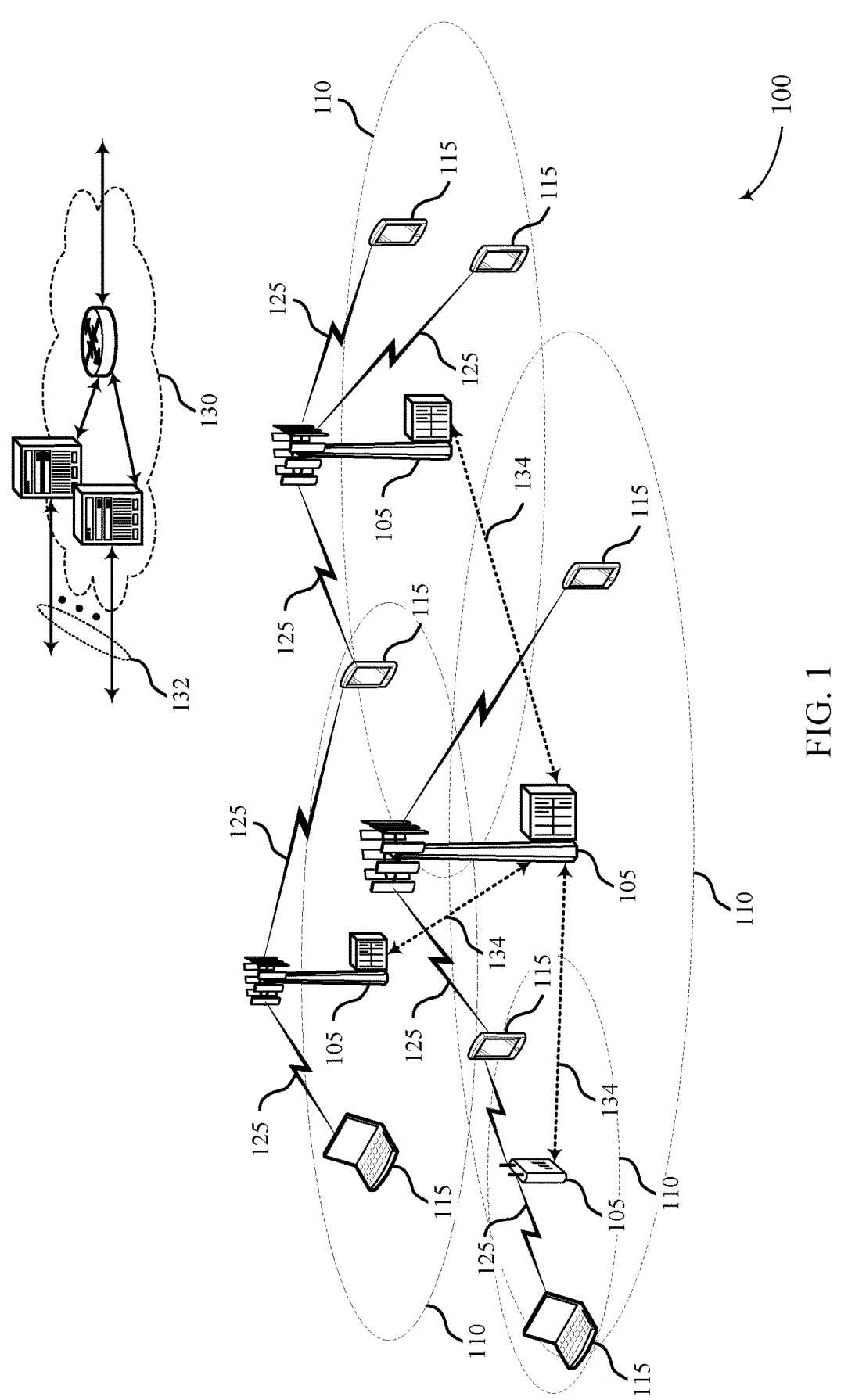
FIG. 1 illustrates aspects of a wireless communications system that supports resource configuration and reservation for sidelink communications in accordance with aspects of the present disclosure.

FIG. 1 illustrates aspects of a wireless communications system 100 that supports resource configuration and reservation for sidelink communications in accordance with aspects of the present disclosure. The wireless communications system 100 includes base stations 105, UEs 115, and a core network 130. According to some aspects, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. According to some aspects, each base station 105 may provide communication coverage for a macro cell, a small cell, a hot spot, or other types of cells, or various combinations thereof. According to some aspects, a base station 105 may be movable and therefore provide communication coverage for a moving geographic coverage area 110. According to some aspects, different geographic coverage areas 110 associated with different technologies may overlap, and overlapping geographic coverage areas 110 associated with different technologies may be supported by the same base station 105 or by different base stations 105. The wireless communications system 100 may include a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. According to some aspects, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. According to some aspects, a carrier of a communication link 125 may include a portion of a radio frequency spectrum band that is operated according to physical layer channels for a given radio access technology. Each physical layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). According to some aspects, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. According to some aspects, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. According to some aspects, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). According to some aspects, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 over a sidelink connection (e.g., using a peer-to-peer (P2P) or device-to-device (D2D) protocol). Such communications may be referred to as D2D or sidelink communications. One or more of a group of UEs 115 utilizing sidelink communications may be within the geographic coverage area 110 of a base station 105. In some cases, other UEs 115 in such a group may be outside the geographic coverage area 110 of a base station 105 or be otherwise unable to receive transmissions from a base station 105. In some cases, groups of UEs 115 communicating via sidelink communications may utilize a one-to-many (1:M) system in which each UE 115 transmits to every other UE 115 in the group.

In some cases, a base station 105 facilitates the scheduling of resources for sidelink communications. In other cases, sidelink communications are carried out between UEs 115 without the involvement of a base station 105. According to some aspects, sidelink communications may include discovery expression transmissions on a physical sidelink discovery channel (PSDCH) (e.g., to allow proximal devices to discover each other's presence). According to some aspects, sidelink communications may include control information transmissions on a physical sidelink control channel (PSCCH). According to some aspects, sidelink communications may include data transmissions on a physical sidelink shared channel (PSSCH). According to some aspects, sidelink communications may include feedback transmissions on a physical sidelink feedback channel (PSFCH).

According to some aspects, sidelink communications may include LTE V2X or cellular V2X (C-V2X), NR V2X or C-V2X, and NR sidelink. In NR-V2X, two modes may be defined for resource allocation. In a first mode (e.g., mode-1), a base station 105 may determine the resources used by a sidelink transmit UE 115 for a sidelink transmission (e.g., on a PSCCH, PSSCH, or PSFCH). In a second mode (e.g., mode-2), a sidelink transmit UE (e.g., not the base station 105) may determine the resources to use for sidelink communications. Sensing and resource selection and reselection related procedures may be supported for the second mode. The sensing procedure may be defined as decoding the sidelink control information (SCI) from other UEs and or performing sidelink measurements. Decoding SCIs in the sensing procedure may provide at least some information on sidelink resources indicated by the UE 115 transmitting the SCI.

NR-V2X may support an initial transmission of a transport block from a sidelink UE 115 without reservation, based on sensing and a resource selection procedure. NR-V2X may support the reservation of a sidelink resource for an initial transmission of a transport block at least by an SCI associated with a different transport block, based on sensing and a resource selection procedure. In some cases, NR-V2X mode-2 may support resource reservation for feedback-based PSSCH retransmissions by signaling associated with a prior transmission of the same transport block (e.g., where the feedback may impact subsequent sensing and resource selection procedures). From the perspective of a transmit sidelink UE 115, the use of HARQ feedback for the release of unused resources may be supported (e.g., with no additional signaling being defined for the purpose of the release of unused resources by the transmit UE 115). Additionally, in mode-2, the SCI payload may indicate the sub-channels and slots used by a UE 115 or reserved by a UE 115 for PSSCH transmissions or retransmissions.

Base stations 105 may communicate with the core network 130 and with one another. According to some aspects, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. According to some aspects, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both unshared (e.g., licensed) and shared (e.g., unlicensed) radio frequency spectrum bands. According to some aspects, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel (e.g., an LBT subchannel or a frequency band that is accessible via an LBT procedure) is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, sidelink transmissions, peer-to-peer transmissions, or a combination of these. Duplexing in unlicensed spectrum may be based on frequency division duplexing (FDD), time division duplexing (TDD), or a combination of both.

In some implementations, there may be different categories of LBT procedures, including category 1 LBT (i.e., no LBT), category 2 LBT (i.e., LBT including one-time channel sensing for a fixed period without a back-off period), category 3 LBT (i.e., LBT with a random (or other) back-off period and a fixed sized contention window), and category 4 LBT (i.e., LBT with a random (or other) back-off period and a variable sized contention window). In some cases, a category 2 LBT procedure may be referred to as a one-time LBT procedure where a UE 115 may perform channel sensing for a defined duration (e.g., 25 μs). Further, a category 4 LBT procedure may be referred to as a fairness-based LBT procedure for performing channel sensing with a backoff, where the backoff may be used to prevent a UE 115 from accessing a channel immediately after detecting that the channel is clear.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ feedback may include an acknowledgement (ACK) indicating that data was received and decoded successfully or a negative acknowledgement (NACK) indicating that data was not received or decoded successfully. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may refer to a sampling period of $T_s = 1/30,720,000$ seconds. Time intervals of a communications resource may be organized according to radio frames each having a duration of 10 milliseconds (ms), where the frame period may be expressed as $T_f = 307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods.

In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs). In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation. Further, some wireless communications systems may implement slot aggregation in which multiple slots or mini-slots are aggregated together and used for communication between a UE 115 and a base station 105.

As mentioned above, wireless communications system 100 may support sidelink communications between UEs 115 (e.g., introduced in LTE), where a UE 115 may send data to another UE 115 without tunneling through a base station 105 or core network 130. In some cases, sidelink communications (e.g., D2D or C-V2X) may be performed over an unshared spectrum (e.g., dedicated spectrum or licensed spectrum), where channel access may be straightforward since a base station 105 may have ownership of the spectrum. In other cases, sidelink communications may be performed over a shared radio frequency spectrum (e.g., in NR unlicensed (NR-U) applications). The shared radio frequency spectrum or shared spectrum may be a spectrum that is unlicensed, licensed to multiple operators, or licensed to a single operation with opportunistic access by other devices (e.g., a licensed radio frequency spectrum, an unlicensed radio frequency spectrum, or a combination of licensed and unlicensed radio frequency spectrum).

NR-U may be targeted to work on the 5 GHz band or the 6 GHz band, where there may be well-defined channel access rules while the channel is shared with another operator or even with other radio access technologies (RATs). However, in NR-U, a base station 105 may not have full ownership or control of the channel, and UEs 115 may contend for access to the channel. NR-U may be used for sidelink operation by allowing a UE 115 to transmit to other UEs 115 over a shared spectrum band to offload traffic using a "free" spectrum. In NR-V2X, a resource pool may be defined for sidelink communications. A resource pool may be a set of time and frequency resources that can be used for sidelink transmission or reception. From the point of view of a UE 115, a resource pool may be inside the bandwidth allocated for the UE 115 and within a sidelink bandwidth part (BWP) and may have a single numerology. The time-domain resources in a resource pool may be non-contiguous (e.g., for NR sidelink in a licensed band), and multiple resource pools may be preconfigured to a UE 115 in a carrier.

Figure 2:
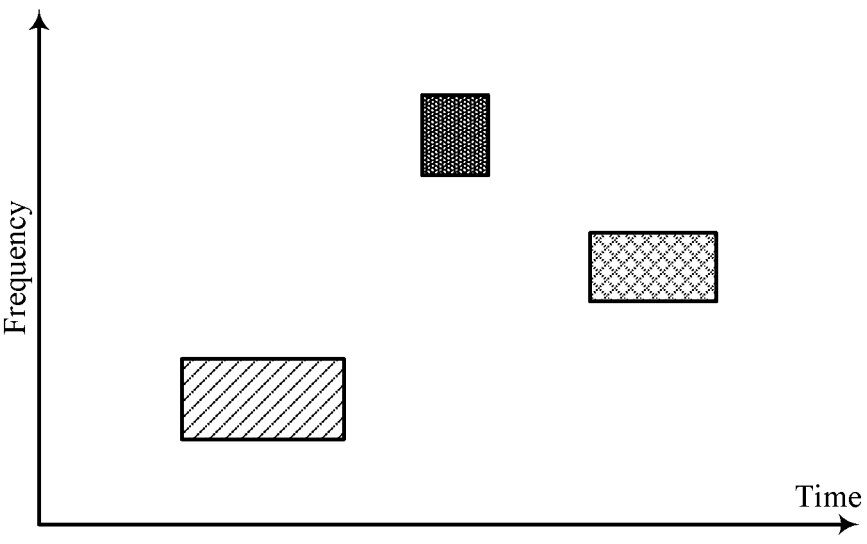
FIG. 2 illustrates aspects of non-contiguous time-domain resources used for sidelink communications in accordance with aspects of the present disclosure.
Figure 2:
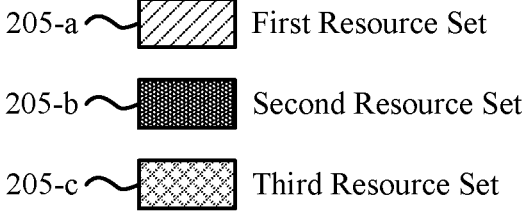

FIG. 2 illustrates aspects of non-contiguous time-domain resources 200 used for sidelink communications in accordance with aspects of the present disclosure. According to aspects illustrated in FIG. 2, a UE 115 may be scheduled to transmit sidelink data to another UE 115 on a first resource set 205-a, a second resource set 205-b, and a third resource set 205-c. If, however, the UE 115 determines to transmit the sidelink data in the shared spectrum, the UE 115 may have to gain access to the shared spectrum multiple (e.g., three) times to transmit the sidelink data on the different, non-contiguous resource sets. In some cases, after giving up access to the shared spectrum (e.g., after transmitting sidelink data on the first resource set 205-a), the UE 115 may fail to regain access to the shared spectrum (e.g., to transmit on the second resource set 205-b or the third resource set 205-c). Accordingly, the UE 115 may not be able to finish transmitting the sidelink data to the other UE 115, resulting in loss of throughput.

In wireless communications system 100, to improve throughput, the time-domain resources in a resource pool configured for sidelink communications in a shared spectrum may be contiguous. As such, a UE 115 may not have to reacquire access to the shared spectrum multiple times to transmit sidelink data to another UE 115. In addition, to give other UEs 115 a chance to access the resource pool, a UE 115 may transmit on interleaved frequency resources in each time interval of a set of contiguous time intervals in the resource pool (e.g., such that the other UEs 115 may access frequency resources not used in the set of contiguous time intervals). In some cases, however, the use of the same frequency resources to transmit sidelink data in multiple time intervals may limit transmit diversity, and the throughput gains achieved by transmitting in contiguous time intervals may be compromised. Further, in some wireless communications systems, a UE 115 may be allowed to reserve resources for retransmissions, and the UE 115 may or may not use the reserved resources. In such systems, the reservation of unused resources may be wasteful and may restrict other UEs 115 from accessing a shared spectrum for sidelink communications. As described herein, UEs 115 in wireless communications system 100 may support techniques for efficiently selecting resources for sidelink communications in a shared spectrum while allowing other UEs 115 a chance to gain access to the shared spectrum.

Figure 3:
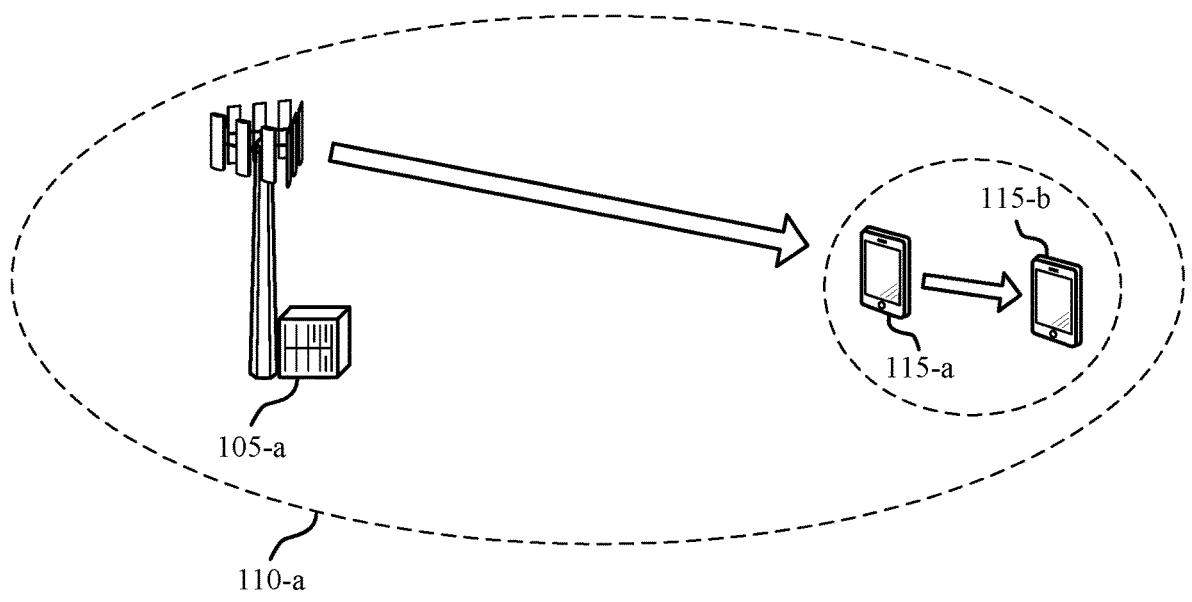
FIG. 3 illustrates aspects of a wireless communications system that supports resource configuration and reservation for sidelink communications in accordance with aspects of the present disclosure.

FIG. 3 illustrates aspects of a wireless communications system 300 that supports resource configuration and reservation for sidelink communications in accordance with aspects of the present disclosure. The wireless communications system 300 includes a base station 105-a, which may be an example of a base station 105 described with reference to FIGS. 1 and 2. The wireless communications system 300 also includes a UE 115-a and a UE 115-b, which may be examples of UEs 115 described with reference to FIGS. 1 and 2. Base station 105-a may provide communications coverage for geographic coverage area 110-a, which may be an example of a geographic area 110 described with reference to FIG. 1. The wireless communications system 300 may implement aspects of the wireless communications system 100. According to some aspects, UE 115-a and UE 115-b in wireless communications system 300 may support techniques for efficiently selecting resources for sidelink communications in a shared spectrum while allowing other UEs 115 a chance to gain access to the shared spectrum.

According to aspects illustrated in FIG. 3, the UE 115-a may receive an indication of (or may otherwise identify) a TFRP configuration that indicates contiguous time intervals (or grids) allocated for sidelink communications in a shared spectrum. The time intervals may start at fixed and common points (e.g., common to all UEs 115, such as at the beginning of every four time slots) and may span multiple time slots. Each time interval may be configured with small gaps within which other UEs 115 may perform LBT procedures to gain access to the shared spectrum. Before UE 115-a transmits sidelink data to UE 115-b in the shared spectrum, the base station 105-a may transmit downlink control information (DCI) or the UE 115-a may transmit SCI indicating the remaining usable interlaces for other UEs 115, a time when channel access will end, etc. Then, as described herein, rather than transmitting the sidelink data on the same interlaced frequency resources across multiple time intervals, UE 115-a may select interlaced frequency resources that frequency hop across time intervals to transmit the sidelink data to UE 115-b to randomize interference and improve throughput.

Figure 4:
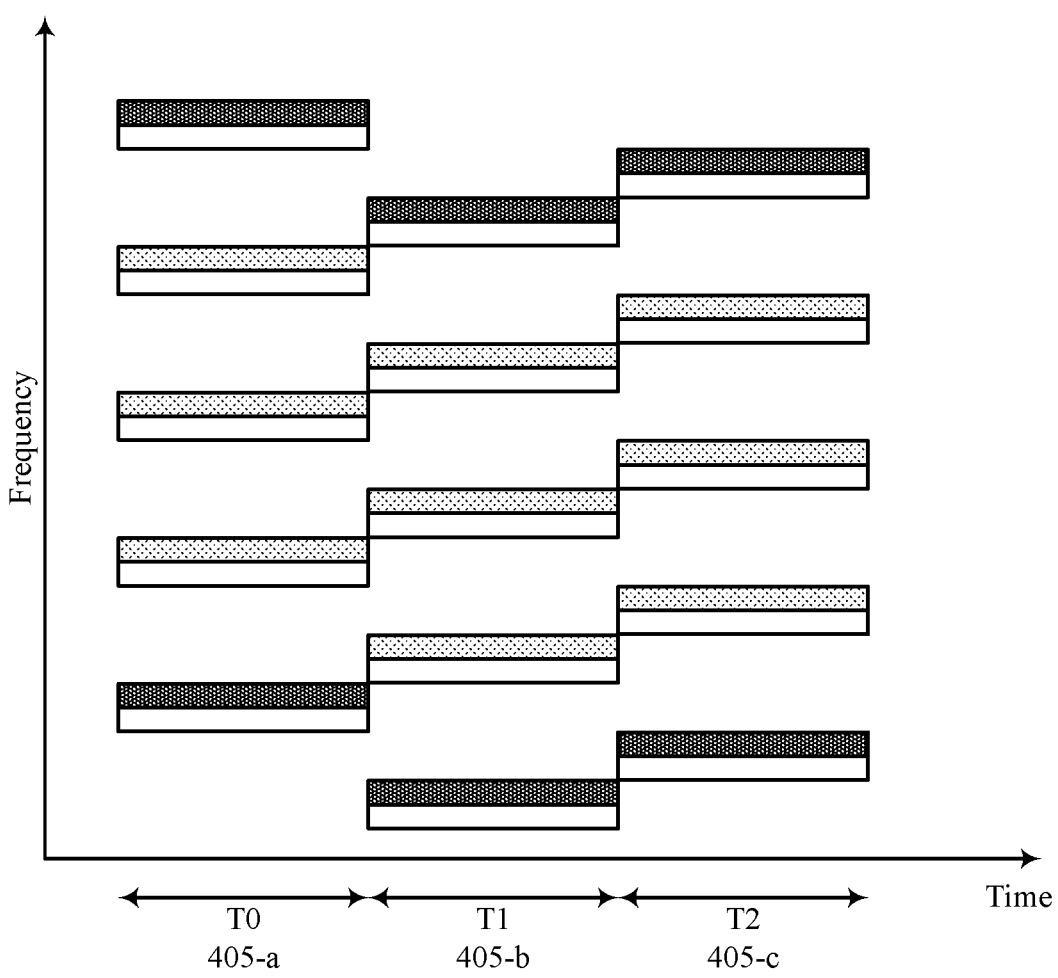
FIG. 4 illustrates aspects of interleaved frequency resources used for sidelink communications in contiguous time-domain resources in accordance with aspects of the present disclosure.
Figure 4:
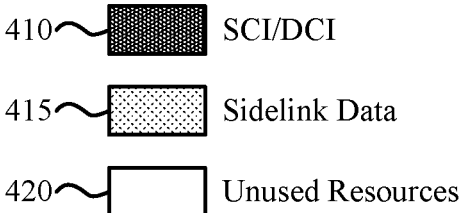
Figure 4:
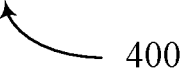

FIG. 4 illustrates aspects of interleaved frequency resources 400 used for sidelink communications in contiguous time-domain resources in accordance with aspects of the present disclosure. The terms interleaved frequency resources and interlaced frequency resources may be used interchangeably herein and may refer to non-contiguous frequency resources arranged in a comb-like structure (e.g., evenly spaced, non-contiguous frequency resources). The use of contiguous time-domain resources for sidelink communications may be described as a case of resource reservation for transmissions or retransmissions of the same transport block or different transport blocks with no gap between the transmissions or retransmissions (e.g., or having gaps smaller than a minimum gap for LBT access by a different device). According to aspects illustrated in FIG. 4, UE 115-a may gain access to a shared spectrum for a channel occupancy time (COT), and the UE 115-a may transmit sidelink data 415 to UE 115-b in the COT. In particular, the UE 115-a may transmit the sidelink data 415 on a first set of interleaved (i.e., interlaced) frequency resources in a first time interval 405-a, a second set of interleaved (i.e., interlaced) frequency resources in a second time interval 405-b, and a third set of interleaved (i.e., interlaced) frequency resources in a third time interval 405-c.

Thus, the different sets of interleaved frequency resources used to transmit sidelink data 415 may frequency hop across multiple time intervals 405. The set of interleaved frequency resources selected in each time interval 405 may be associated with an interlace index and may be one set of a number of different sets of interleaved frequency resources each corresponding to a different interlace index. In some cases, the UE 115-*a* may transmit SCI 410, or the base station 105-*a* may transmit DCI 410, indicating the resources used by UE 115-*a* to transmit the sidelink data 415 to UE 115-*b*. Thus, other UEs 115 may decode the SCI or DCI 410 to determine the resources being used by UE 115-*a* and to identify unused resources 420 available for sidelink communications. In other cases, the resources used by UE 115-*a* to transmit the sidelink data 415 may be preconfigured, and other UEs 115 may identify the unused resources 420 based on one or more factors as described in further detail below.

According to some aspects, COT sharing may be done per time interval 405, and the SCI or DCI 410 in each time interval 405 may indicate the available or unused time and frequency resources in the time interval 405 (e.g., unused resources 420). For instance, the SCI or DCI 410 in the first time interval 405-*a* may indicate the first set of interleaved frequency resources used by UE 115-*a* in one or more time slots of the first time interval 405-*a*, and other UEs 115 may determine the unused resources 420 in the first time interval 405-*a* based on decoding the SCI or DCI 410 in the first time interval 405-*a*. For these aspects, because the other UEs 115 may have to decode the SCI or DCI 410 at the beginning of a time interval 405 before transmitting in the time interval 405, COT sharing may not be maximized. That is, the other UEs 115 may stop transmitting in a COT and may not rejoin the COT in a time interval 405 until the UE 115 has decoded the DCI or SCI 410 in the time interval 405.

According to some aspects, COT sharing may be done across time intervals 405, and the SCI or DCI 410 in each time interval 405 may indicate the available or unused time and frequency resources in a next time interval 405 following the time interval 405 (e.g., unused resources 420). For instance, the SCI or DCI 410 in the first time interval 405-*a* may indicate the second set of interleaved frequency resources used by UE 115-*a* in one or more time slots of the second time interval 405-*b*, and other UEs 115 may determine the unused resources 420 in the second time interval 405-*b* based on decoding the SCI or DCI 410 in the first time interval 405-*a*. Thus, within each time grid, the SCI or DCI 410 may indicate unused interlaces for the next time grid. In some cases, the SCI or DCI 410 in a previous time interval 405 may also indicate when the gaps in a next time interval 405 are budgeted for other UEs 115 to perform LBT procedures to gain access to the unused resources 420 in the next time interval 405. In such cases, the UE 115-*a* may stop transmitting in the next time interval 405 during the gaps to prevent mutual blocking (e.g., to avoid blocking the other UEs 115 from accessing the unused resources 420). As such, the short gaps may allow UE 115-*a* to share a COT with other UEs 115 (e.g., on interlace indices or frequency resources that are not used by UE 115-*a*).

According to some aspects, COT sharing may be done per time interval 405 or across time intervals 405, and the SCI or DCI 410 may indicate the frequency hopping pattern used by UE 115-*a* to transmit the sidelink data 415 across the multiple time intervals 405. For instance, the SCI or DCI 410 in the first, second, or third time interval 405 or in a previous time interval 405 may indicate the frequency hopping pattern corresponding to the first, second, and third sets of interleaved frequency resources used by UE 115-*a* to transmit the sidelink data 415 in the first, second, and third time intervals 405. That is, the SCI or DCI 410 may indicate a virtual interlace index of a set of virtual interlace indices, where each virtual interlace index indicates a set of interlace indices used by UE 115-*a* across multiple time intervals 405, and each interlace index identifies a set of interleaved frequency resources in a respective time interval 405.

According to some aspects, the frequency hopping pattern may be preconfigured (e.g., the group hopping or sequence hopping from the uplink demodulation reference signal (DMRS) hopping pattern may be adapted for sidelink transmissions). In any case, regardless of whether the frequency hopping pattern is preconfigured or indicated in SCI or DCI 410, each interlace index within each time interval 405 indicated by the frequency hopping pattern may depend on one or more factors. For instance, each interlace index within each time interval 405 that corresponds to the set of interleaved frequency resources used by UE 115-*a* in the time interval 405 may be a function of one or more factors, including a subcarrier spacing of the time interval 405, a sidelink ID of UE 115-*a*, a pool ID associated with the resources used by UE 115-*a*, or some higher layer parameters associated with group hopping (e.g., received in higher layer signaling used to enable or disable group hopping). If the frequency hopping pattern is preconfigured, other UEs 115 may determine the frequency hopping pattern used by UE 115-*a* to transmit the sidelink data 415 based on the one or more factors.

Once another UE 115 receives the SCI or DCI 410 indicating the set of interleaved frequency resources or otherwise identifies the set of interleaved frequency resources used by UE 115-*a* to transmit sidelink data 415 to UE 115-*b*, the other UE 115 may identify the unused resources 420 and may contend for access to the unused resources 420 for sidelink communications. In particular, the other UE 115 may identify a different set of interleaved frequency resources in a time interval 405 from the set of interleaved frequency resources used by UE 115-*a*, where the different set of interleaved frequency resources may correspond to a different frequency hopping pattern from the frequency hopping pattern used by UE 115-*a*. The other UE 115 may then transmit sidelink data across one or more time intervals 405 based on the different frequency hopping pattern (e.g., including at least transmitting the sidelink data on the different set of interleaved frequency resources in the time interval 405).

In addition to the techniques described above, in some cases, it may be appropriate for a UE 115 to release reserved, unused resources to allow other UEs 115 to gain access to a shared spectrum. In particular, because a UE 115 may reserve resources for a retransmission after an initial transmission (e.g., using signaling associated with the initial transmission), and the UE 115 may receive feedback indicating that the initial transmission was received successfully before the retransmission, the reservation of the resources for the retransmission may be underutilized.

As described herein, a UE 115 may be configured to release resources reserved for a retransmission of a transport block after receiving feedback indicating that a previous transmission of the transport block was successfully received. In addition, other UEs 115 may be configured to use the released resources after receiving the feedback indicating that the initial transmission of the transport block from the UE 115 was successfully received. That is, the other UEs 115 may rely on HARQ feedback to determine when reserved resources are released, and the other UEs 115 may use the released resources for sidelink communications. In some aspects, when a first UE 115 receives a feedback message indicating that a transmission from a second UE 115 was successfully received by a third UE 115, the first UE 115 may use resources reserved by the second UE 115 (e.g., for a subsequent retransmission) to transmit sidelink data to a fourth UE 115 (e.g., the second UE 115 may release the reserved, unused resources). Thus, for reservation of a COT with feedback-based PSSCH transmissions or retransmissions, an ACK sent by the third UE 115 (e.g., a receive UE 115) in a PSFCH may indicate to the first UE 115 (e.g., and other UEs 115) that the reservation is done and the rest of the COT can be shared.

In some cases, the SCI or DCI transmitted by the second UE 115 before a transmission of sidelink data may indicate whether the first UE 115 (e.g., and other UEs 115) may monitor a PSFCH to determine whether to access resources reserved for a retransmission of the data. That is, the SCI or DCI may indicate whether PSFCH may be used as an indication for COT sharing. If the SCI or DCI indicates that PSFCH may be used as an indication for COT sharing, the first UE 115 (e.g., and other UEs 115) may access the resources reserved for a retransmission by the second UE 115 after receiving an ACK on the PSFCH. In particular, other transmit UEs 115 may receive an indication (e.g., configured by SCI or DCI of the second UE 115) of when the UEs 115 are eligible to join or access resources reserved for a retransmission. In some aspects, the other transmit UEs 115 may be eligible to join or access resources reserved for a retransmission (e.g., using a category 2 LBT procedure) one slot after the slot (e.g., slot n) in which an ACK is received (e.g., from the third UE 115) or soon after receiving the ACK on the PSFCH.

Figure 5:
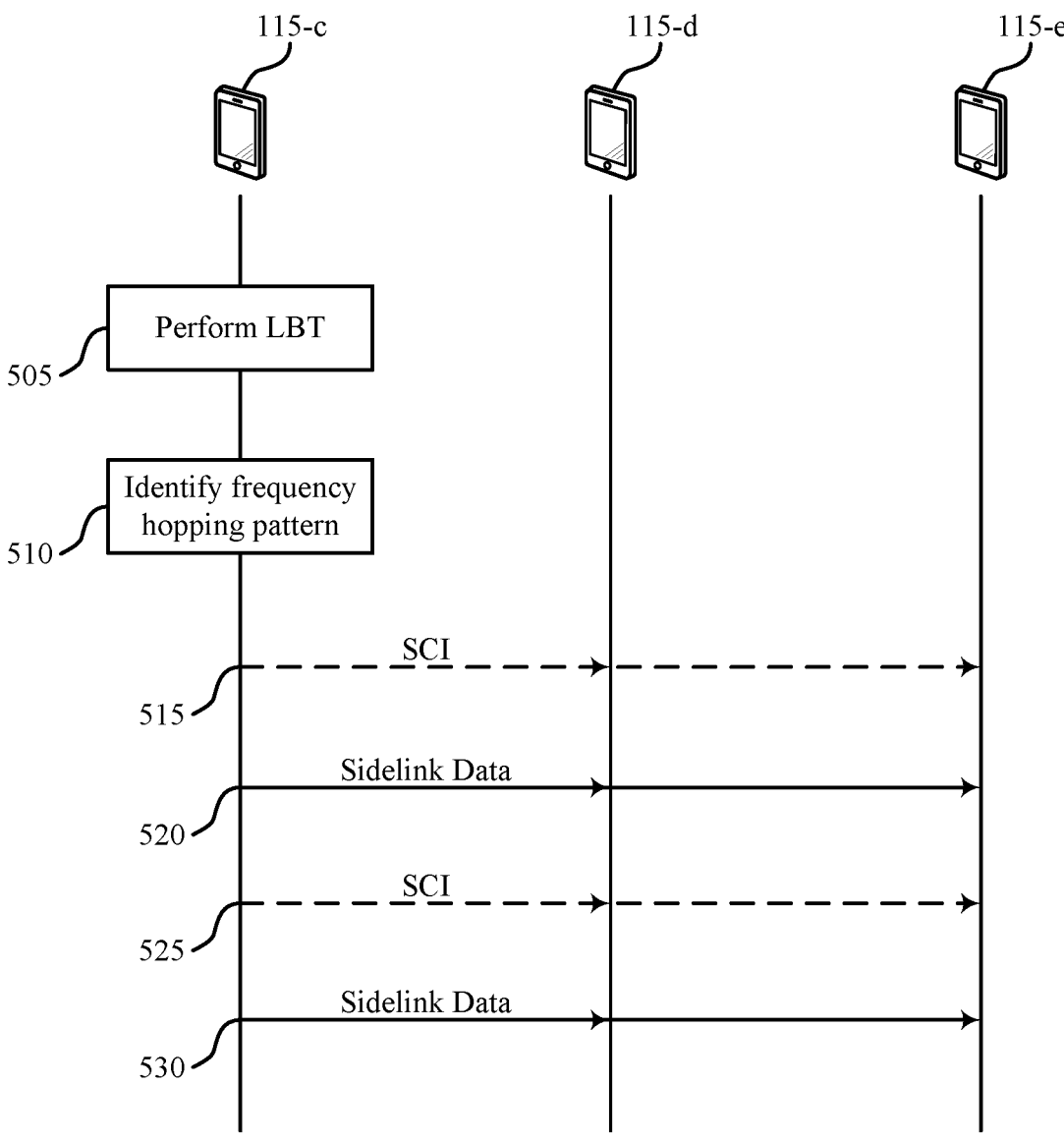
FIG. 5 illustrates aspects of a process flow that supports resource configuration and reservation for sidelink communications in accordance with aspects of the present disclosure.

FIG. 5 illustrates aspects of a process flow 500 that supports resource configuration and reservation for sidelink communications in accordance with aspects of the present disclosure. The process flow 500 illustrates aspects of techniques performed by a UE 115-c, a UE 115-d, and a UE 115-e, which may be examples of a UE 115 described with reference to FIGS. 1-4. In FIG. 5, the UE 115-c may receive (or otherwise identify) a resource pool configuration indicating resources in a shared radio frequency spectrum band available to the UE 115-c for sidelink communications, where the resources include contiguous time intervals.

At 505, UE 115-c may perform an LBT procedure to gain access to the shared spectrum band for a COT to transmit sidelink data to UE 115-e. The COT may span one or more contiguous time intervals of the contiguous time intervals indicated by the resource pool configuration. At 510, UE 115-c may identify a frequency hopping pattern including a first set of interleaved frequency resources for transmitting the sidelink data in a first time interval and a second set of interleaved frequency resources for transmitting the sidelink data in a second time interval. That is, if the LBT procedure is successful, the UE 115-c may reserve resources for transmitting the sidelink data based on the frequency hopping pattern.

At 515, UE 115-c may transmit SCI in the first time interval with the sidelink data on at least a subset of the first set of interleaved frequency resources. The SCI may indicate the first set of interleaved frequency resources being used by the UE 115-c to transmit the sidelink data to the UE 115-e. According to some aspects, when sidelink communications are scheduled by a base station 105 (e.g., rather than by the UE 115-c), the base station 105 may transmit DCI to UE 115-c, UE 115-d, and UE 115-e indicating the first set of interleaved frequency resources being used by the UE 115-c to transmit the sidelink data to the UE 115-e (e.g., the UE 115-c may not transmit the SCI). At 520, the UE 115-c may then transmit the sidelink data to UE 115-e in the first time interval on the first set of interleaved frequency resources.

At 525, UE 115-c may transmit SCI in the second time interval with the sidelink data on at least a subset of the second set of interleaved frequency resources. The SCI may indicate the second set of interleaved frequency resources being used by the UE 115-c to transmit the sidelink data to the UE 115-e. According to some aspects, when sidelink communications are scheduled by a base station 105 (e.g., rather than by the UE 115-c), the base station 105 may transmit DCI to UE 115-c, UE 115-d, and UE 115-e indicating the second set of interleaved frequency resources being used by the UE 115-c to transmit the sidelink data to the UE 115-e (e.g., the UE 115-c may not transmit the SCI). At 530, the UE 115-c may then transmit the sidelink data to UE 115-e in the second time interval on the second set of interleaved frequency resources. In some cases, UE 115-c may also transmit an indication of gaps in the first time interval, the second time interval, or both allocated for other UEs (e.g., UE 115-d) to perform LBT procedures to gain access to the shared spectrum.

As described above, the UE 115-c may transmit the SCI and the sidelink data to UE 115-e, but the resources used to transmit the SCI and the sidelink data may be monitored by UE 115-d. That is, the UE 115-d may monitor the pool of resources configured for sidelink communications in a shared spectrum. Thus, when the UE 115-d identifies data to transmit to another UE 115, the UE 115-d may decode the SCI to identify if other UEs 115 have reserved resources of the shared spectrum band for sidelink communications. Alternatively, the UE 115-d may decode DCI to identify if other UEs 115 have reserved resources of the shared spectrum band for sidelink communications (e.g., if sidelink communications are scheduled by a base station 105). Although FIG. 5 illustrates that the UE 115-d may receive SCI from the UE 115-c to identify resources being used by the UE 115-c for sidelink communications, it is to be understood that the UE 115-d may receive and decode DCI to identify resources being used by the UE 115-c for sidelink communications. Thus, SCI and DCI may be used interchangeably in some aspects described herein.

According to aspects illustrated in FIG. 5, UE 115-d may identify, from the SCI, that UE 115-c has reserved the shared spectrum for sidelink communications in the COT. UE 115-d may then identify, from the SCI, at least one set of interleaved frequency resources that is available for a time interval. That is, the SCI at 515 or the SCI at 525 may indicate the at least one set of interleaved frequency resources that is available for the time interval. The at least one set of interleaved frequency resources may be one of multiple sets of interleaved frequency resources that frequency hop between time intervals based on respective frequency hopping patterns. UE 115-d may perform an LBT procedure (e.g., category 2 LBT) for the available set of interleaved frequency resources and may transmit to another UE 115 over the set of interleaved frequency resources if the LBT procedure is successful (not shown).

According to some aspects, the SCI in the first time interval may indicate the first set of interleaved frequency resources used by UE 115-c to transmit the sidelink data in the first time interval, and the SCI in the second time interval may indicate the second set of interleaved frequency resources used by UE 115-c to transmit the sidelink data in the second time interval. In such cases, UE 115-d may identify a set of interleaved frequency resources that is available for the first time interval after decoding the SCI received at the beginning of the first time interval, and UE 115-d may identify a set of interleaved frequency resources that is available for the second time interval after decoding the SCI received at the beginning of the second time interval.

According to some aspects, the SCI in a previous time interval may indicate the first set of interleaved frequency resources used by UE 115-c to transmit the sidelink data in the first time interval, and the SCI in the first time interval may indicate the second set of interleaved frequency resources used by UE 115-c to transmit the sidelink data in the second time interval. In such cases, UE 115-d may identify a set of interleaved frequency resources that is available for the first time interval after decoding the SCI received in the previous time interval (e.g., in advance of the first time interval), and UE 115-d may identify a set of interleaved frequency resources that is available for the second time interval after decoding the SCI received in the first time interval (e.g., in advance of the second time interval).

According to some aspects, the SCI in the first time interval, the second time interval, or a previous time interval may indicate a frequency hopping pattern used by UE 115-c to transmit the sidelink data on the first set of interleaved frequency resources in the first time interval and the second set of interleaved frequency resources in the second time interval. In such cases, UE 115-d may identify a set of interleaved frequency resources that is available for the first time interval after decoding the SCI received in the first time interval or SCI received in a previous time interval (e.g., indicating the frequency hopping pattern used by UE 115-c), and UE 115-d may identify a set of interleaved resources that is available for the second time interval after decoding the SCI received in the second time interval or SCI received in a previous time interval (e.g., indicating the frequency hopping pattern used by UE 115-c).

According to some aspects, the first set of interleaved frequency resources used by UE 115-c in the first time interval and the second set of interleaved frequency resources used by UE 115-c in the second time interval may be preconfigured (e.g., in the resource pool configuration). In some aspects, respective sets of interleaved frequency resources in each time interval may be based one or more factors, such as a subcarrier spacing of the time interval, a sidelink ID of UE 115-c, a resource pool ID of the respective set of interleaved frequency resources, or one or more parameters associated with group hopping of frequency resources. In such cases, UE 115-d may identify a set of interleaved frequency resources that is available for the first time interval after determining that UE 115-c is using the first set of interleaved frequency resources in the first time interval based on the one or more factors, and UE 115-d may identify a set of interleaved frequency resources that is available for the second time interval after determining that UE 115-c is using the second set of interleaved frequency resources in the second time interval based on the one or more factors.

The set of interleaved frequency resources available in the first time interval may be different from (e.g., non-overlapping with) the first set of interleaved frequency resources, and the set of interleaved frequency resources available in the second time interval may be different from (e.g., non-overlapping with) the second set of interleaved frequency resources. Thus, when UE 115-d identifies the available set of interleaved frequency resources in the first time interval, UE 115-d may perform an LBT procedure to gain access to the available set of interleaved frequency resources and may transmit sidelink data to another UE 115 on the available set of interleaved frequency resources in the first time interval.

Additionally, or alternatively, when UE 115-d identifies the available set of interleaved frequency resources in the second time interval, UE 115-d may perform an LBT procedure to gain access to the available set of interleaved frequency resources and may transmit sidelink data to another UE 115 on the available set of interleaved frequency resources in the second time interval (not shown).

Figure 6:
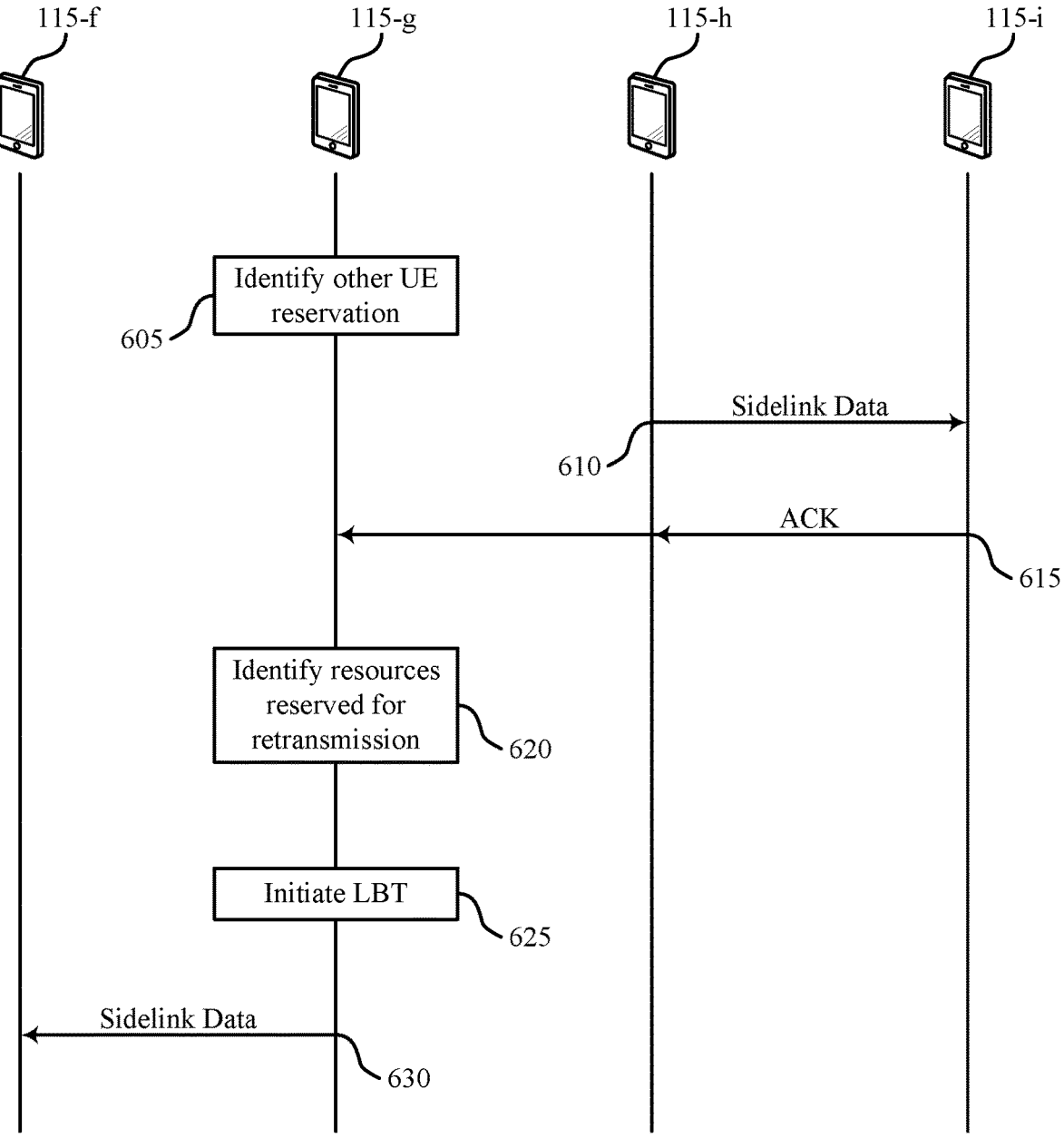
FIG. 6 illustrates aspects of a process flow that supports resource configuration and reservation for sidelink communications in accordance with aspects of the present disclosure.

FIG. 6 illustrates aspects of a process flow 600 that supports resource configuration and reservation for sidelink communications in accordance with aspects of the present disclosure. The process flow 600 illustrates aspects of techniques performed by a UE 115-f, a UE 115-g, a UE 115-h, and a UE 115-i, which may be examples of a UE 115 described with reference to FIGS. 1-5.

At 605, UE 115-g may identify that UE 115-h has reserved a shared spectrum for sidelink communications in a COT spanning a set of contiguous time intervals. At 610, UE 115-h may transmit sidelink data to UE 115-i, and, at 615, UE 115-h may receive an ACK for the sidelink data transmitted at 610. As illustrated by aspects of FIG. 6, though UE 115-i may transmit the ACK to UE 115-h, the resources used to transmit the ACK may be monitored by UE 115-g. That is, the UE 115-g may monitor the pool of resources configured for sidelink communications in a shared spectrum. Thus, UE 115-g may receive the ACK transmitted by UE 115-i at 615, and, at 620, UE 115-g may identify resources reserved for a retransmission of the sidelink data transmitted at 610.

At 625, UE 115-g may then initiate an LBT procedure to gain access to the identified resources for at least one interval of the COT. At 630, UE 115-g may transmit, based on a result of the LBT procedure, sidelink data to UE 115-f on the identified resources based on receiving the ACK transmitted by UE 115-i. That is, because the sidelink data transmitted at 610 may be successfully received by the UE 115-i, the UE 115-h may not use the resources reserved for retransmission of the sidelink data. Thus, the UE 115-g may identify the resources that are unused by the UE 115-h, and the UE 115-g may transmit sidelink data to the UE 115-f on the resources.

In some cases, UE 115-g may receive control information (e.g., SCI from UE 115-g or DCI from a base station 105) indicating that the resources reserved for the retransmission are released by UE 115-h upon UE 115-i acknowledging receipt of the transmission of sidelink data at 610. The control information may indicate a quantity of slots after receiving the ACK that UE 115-g is to wait before transmitting the sidelink data at 630 on the resources reserved for the retransmission. The control information may also indicate that UE 115-g is eligible to transmit using the identified resources for the at least one interval of the COT.

Figure 7:
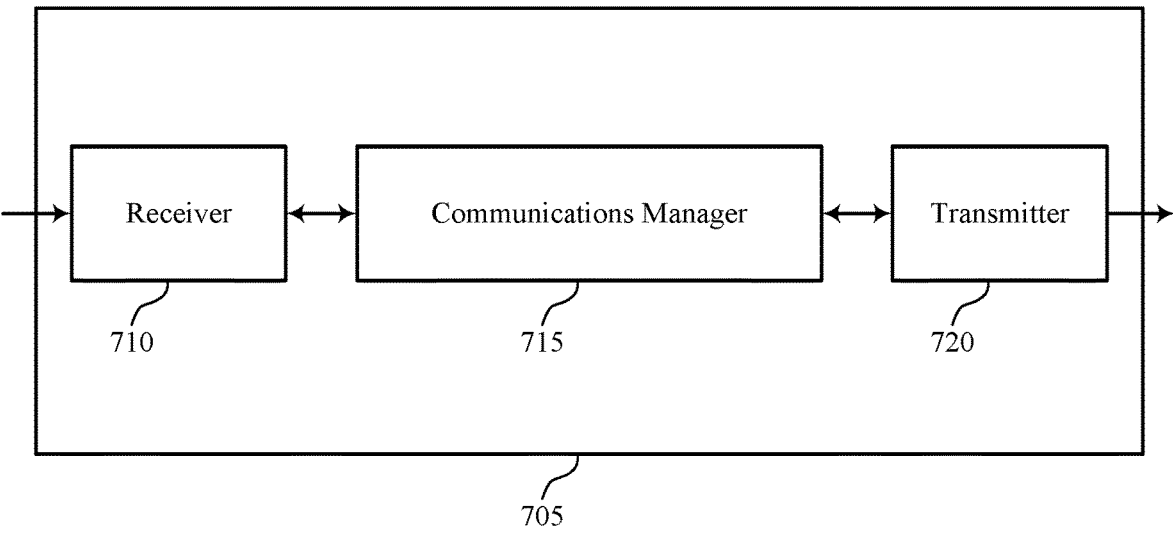
FIGS. 7 and 8 show block diagrams of devices that support resource configuration and reservation for sidelink communications in accordance with aspects of the present disclosure.

FIG. 7 shows a block diagram 700 of a device 705 that supports resource configuration and reservation for sidelink communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to resource configuration and reservation for sidelink communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may be implemented as an integrated circuit or chipset for the device 705, and the receiver 710 and the transmitter 720 may be implemented as analog components (for example, amplifiers, filters, antennas) coupled with the device 705 modem to enable wireless transmission and reception. The actions performed by the communications manager 715 as described herein may be implemented to realize one or more potential advantages. At least one implementation may enable the communications manager 715 to efficiently select resources for sidelink communications in a shared spectrum while allowing other UEs a chance to gain access to the shared spectrum. Because the resources selected for sidelink communications may include interleaved frequency resources, one or more processors of the device 705 (for example, processor(s) controlling or incorporated with the communications manager 715) may experience power savings (e.g., increased battery life) since the UE may reliably transmit sidelink data, and the UE may avoid reacquiring access to the shared spectrum for a retransmission of the sidelink data.

The communications manager 715 may identify a resource pool configuration indicating resources in a shared radio frequency spectrum band available to the first UE for sidelink communications, the resources comprising a plurality of contiguous time intervals, identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals, and transmit, to a second UE, the sidelink data on the first set of interleaved frequency resources in the first time interval and the second set of interleaved frequency resources in the second time interval based on the frequency hopping pattern.

The communications manager 715 may also identify that a second UE has reserved a shared radio frequency spectrum band for sidelink communications in a channel occupancy time, the channel occupancy time spanning a set of contiguous time intervals, receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns, and transmit, to a third UE, sidelink data in the time interval on the at least one set of interleaved frequency resources.

The communications manager 715 may also identify that a second UE has reserved a shared radio frequency spectrum band for sidelink communications in a channel occupancy time, the channel occupancy time spanning a set of contiguous time intervals, receive a feedback message transmitted by a third UE acknowledging receipt of a transmission of first sidelink data from the second UE, identify resources reserved for a retransmission of the first sidelink data from the second UE to the third UE, initiate a listen-before-talk procedure to gain access to the identified resources for at least one interval of the channel occupancy time, and transmit, based on a result of the listen-before-talk procedure, second sidelink data to a fourth UE on the identified resources based on receiving the feedback message. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. According to some aspects, the communications manager 715, or its sub-components, may be a separate and distinct component in accordance with various aspects of the present disclosure. According to some aspects, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. According to some aspects, the transmitter 720 may be collocated with a receiver 710 in a transceiver module. According to some aspects, the transmitter 720 may be an example of aspects of the transceiver 1020 described with reference to FIG. 10. The transmitter 720 may utilize a single antenna or a set of antennas.

Figure 8:
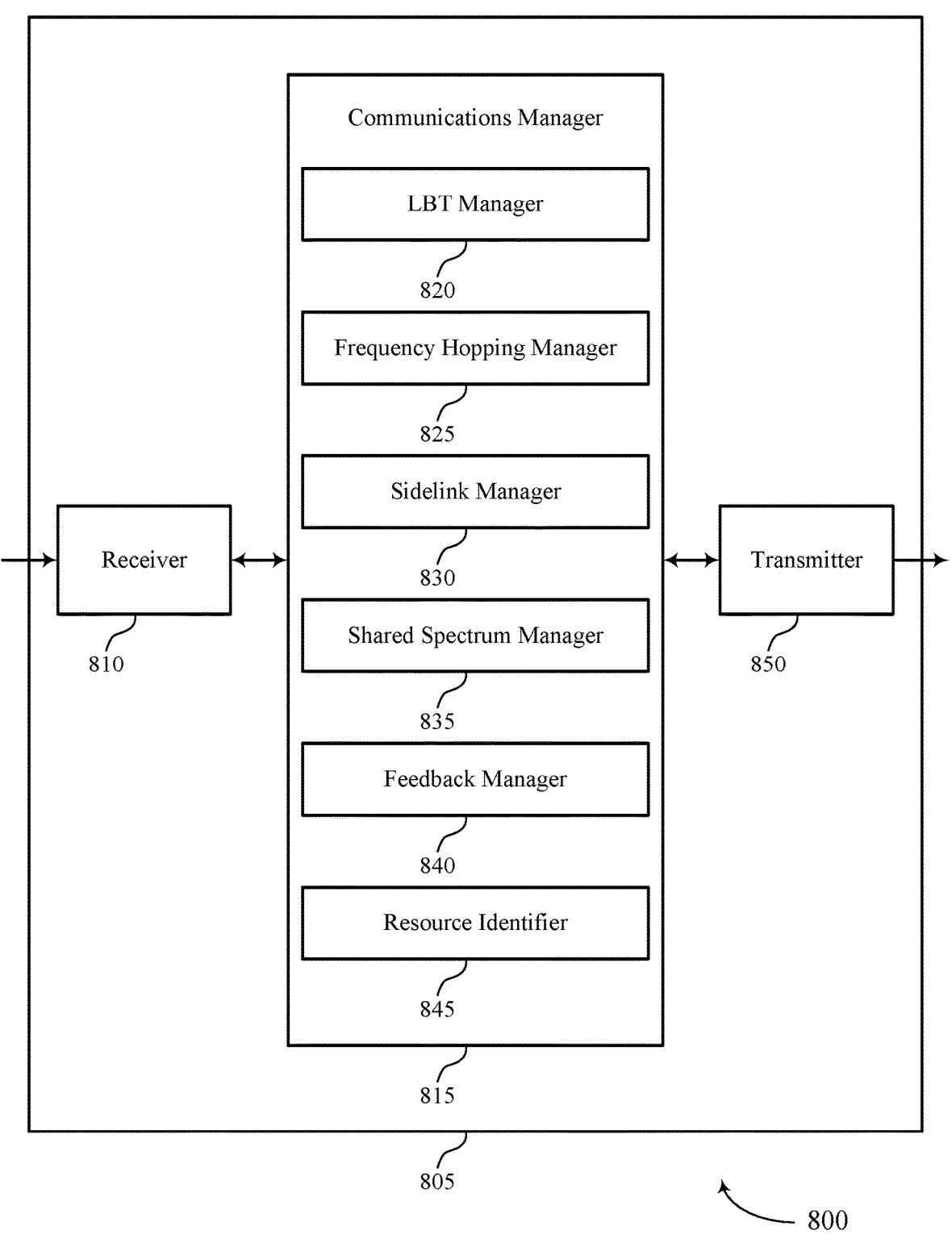

FIG. 8 shows a block diagram 800 of a device 805 that supports resource configuration and reservation for sidelink communications in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to resource configuration and reservation for sidelink communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an LBT manager 820, a frequency hopping manager 825, a sidelink manager 830, a shared spectrum manager 835, a feedback manager 840, and a resource identifier 845. The communications manager 815 may be an example of aspects of the communications manager 1010 described herein.

The sidelink manager 830 may receive a resource pool configuration indicating resources in a shared radio frequency spectrum band available to the first UE for sidelink communications, the resources comprising a plurality of contiguous time intervals. For example, the sidelink manager 830 may receive the resource pool configuration from a base station (e.g., via RRC signaling). The frequency hopping manager 825 may identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals. The sidelink manager 830 may transmit, to a second UE, the sidelink data on the first set of interleaved frequency resources in the first time interval and the second set of interleaved frequency resources in the second time interval based on the frequency hopping pattern.

The shared spectrum manager 835 may identify that a second UE has reserved a shared radio frequency spectrum band for sidelink communications in a channel occupancy time, the channel occupancy time spanning a set of contiguous time intervals. The frequency hopping manager 825 may receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns. The sidelink manager 830 may transmit, to a third UE, sidelink data in the time interval on the at least one set of interleaved frequency resources.

The shared spectrum manager 835 may identify that a second UE has reserved a shared radio frequency spectrum band for sidelink communications in a channel occupancy time, the channel occupancy time spanning a set of contiguous time intervals. The feedback manager 840 may receive a feedback message transmitted by a third UE acknowledging receipt of a transmission of first sidelink data from the second UE. The resource identifier 845 may identify resources reserved for a retransmission of the first sidelink data from the second UE to the third UE. The LBT manager 820 may initiate a listen-before-talk procedure to gain access to the identified resources for at least one interval of the channel occupancy time. The sidelink manager 830 may transmit, based on a result of the listen-before-talk procedure, second sidelink data to a fourth UE on the identified resources based on receiving the feedback message.

The transmitter 850 may transmit signals generated by other components of the device 805. According to some aspects, the transmitter 850 may be collocated with a receiver 810 in a transceiver module. According to some aspects, the transmitter 850 may be an example of aspects of the transceiver 1020 described with reference to FIG. 10. The transmitter 850 may utilize a single antenna or a set of antennas.

Figure 9:
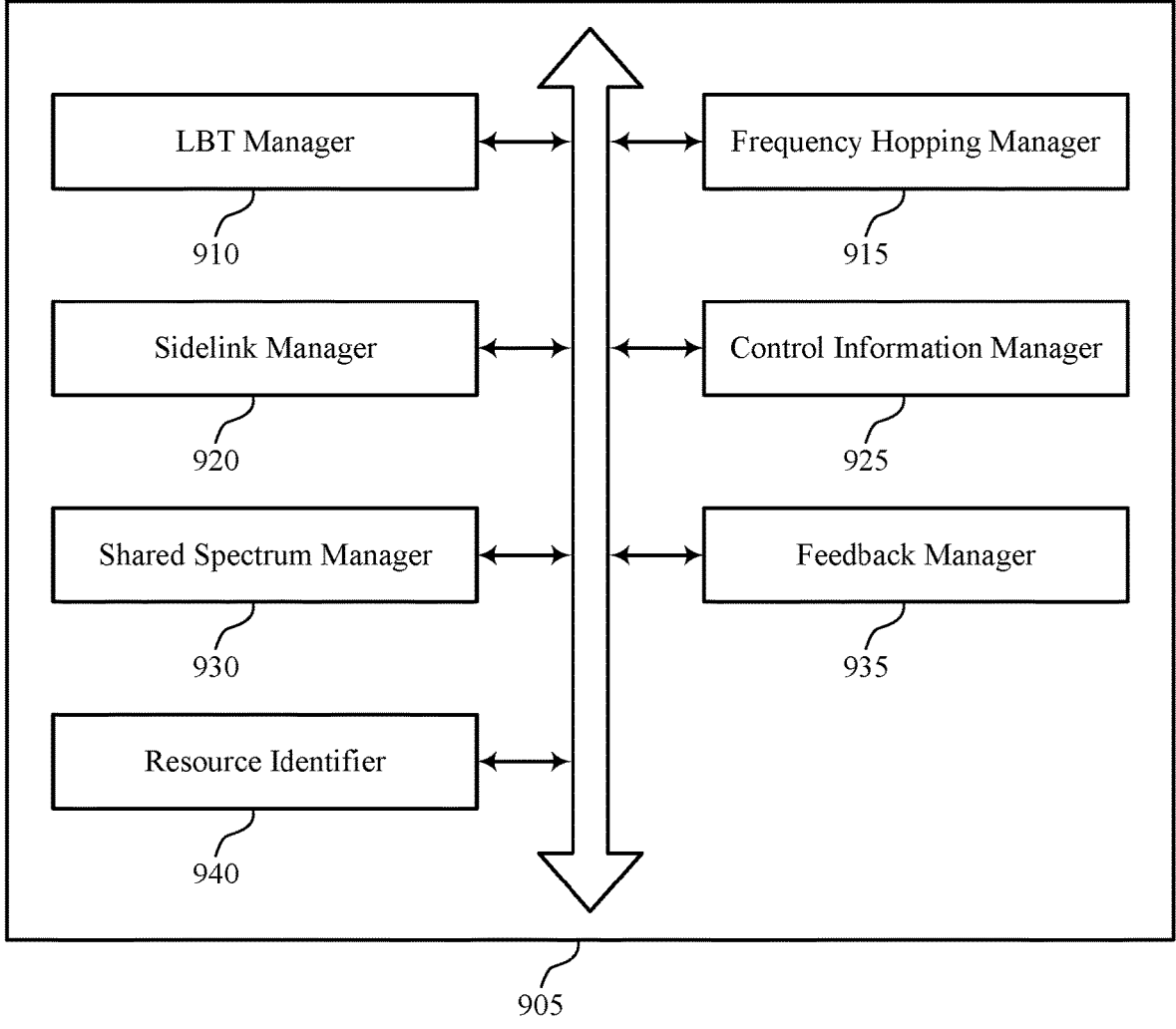
FIG. 9 shows a block diagram of a communications manager that supports resource configuration and reservation for sidelink communications in accordance with aspects of the present disclosure.

FIG. 9 shows a block diagram 900 of a communications manager 905 that supports resource configuration and reservation for sidelink communications in accordance with aspects of the present disclosure. The communications manager 905 may be an example of aspects of a communications manager 715, a communications manager 815, or a communications manager 1010 described herein. The communications manager 905 may include an LBT manager 910, a frequency hopping manager 915, a sidelink manager 920, a control information manager 925, a shared spectrum manager 930, a feedback manager 935, and a resource identifier 940. Each of these modules may communicate, directly or indirectly, with one another (e.g., via one or more buses).

The sidelink manager 920 may identify a resource pool configuration indicating resources in a shared radio frequency spectrum band available to the first UE for sidelink communications, the resources comprising a plurality of contiguous time intervals. For example, the sidelink manager 920 may receive the resource pool configuration from a base station (e.g., via RRC signaling). The frequency hopping manager 915 may identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals. The sidelink manager 920 may transmit, to a second UE, the sidelink data on the first set of interleaved frequency resources in the first time interval and the second set of interleaved frequency resources in the second time interval based on the frequency hopping pattern.

According to some aspects, the LBT manager 910 may perform a listen-before-talk procedure to gain access to the shared radio frequency spectrum band for a channel occupancy time to transmit the sidelink data to the second UE, the channel occupancy time spanning at least the first time interval and the second time interval of the plurality of contiguous time intervals. The control information manager 925 may receive control information indicating at least one set of interleaved frequency resources that is available for each time interval of the plurality of contiguous time intervals, and the frequency hopping manager 915 may identify the frequency hopping pattern including the first set of interleaved frequency resources in the first time interval and the second set of interleaved frequency resources in the second time interval based at least in part on receiving the control information.

The control information manager 925 may transmit, in the first time interval, an indication of the first set of interleaved frequency resources used for transmitting the sidelink data in the first time interval. According to some aspects, the control information manager 925 may transmit, in the second time interval, an indication of the second set of interleaved frequency resources used for transmitting the sidelink data in the second time interval. According to some aspects, the control information manager 925 may transmit, in the first time interval, an indication of the second set of interleaved frequency resources used for transmitting the sidelink data in the second time interval. According to some aspects, the control information manager 925 may transmit, in the first time interval, the second time interval, or both, an indication of the frequency hopping pattern used by the first UE to transmit sidelink data on the first set of interleaved frequency resources in the first time interval and on the second set of interleaved frequency resources in the second time interval.

According to some aspects, the control information manager 925 may transmit an indication of gaps in the first time interval, the second time interval, or both, allocated for other UEs to perform listen-before-talk procedures to gain access to the shared radio frequency spectrum band. In some cases, respective sets of interleaved frequency resources in each time interval of the set of contiguous time intervals are based on a subcarrier spacing of the time interval, a sidelink ID of the first UE, a resource pool ID of the respective set of interleaved frequency resources, one or more parameters associated with group hopping of frequency resources, or a combination thereof.

The shared spectrum manager 930 may identify that a second UE has reserved a shared radio frequency spectrum band for sidelink communications in a channel occupancy time, the channel occupancy time spanning a set of contiguous time intervals. According to some aspects, the frequency hopping manager 915 may receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns. According to some aspects, the sidelink manager 920 may transmit, to a third UE, sidelink data in the time interval on the at least one set of interleaved frequency resources.

In some cases, the control information is received in the time interval, the control information including an indication of a set of interleaved frequency resources reserved by the second UE for sidelink communications in the time interval. In some cases, the time interval is a first time interval and the control information is received in a second time interval preceding the first time interval, the control information including an indication of a set of interleaved frequency resources reserved by the second UE for sidelink communications in the first time interval. In some cases the control information includes an indication of a frequency hopping pattern used by the second UE for sidelink communications in the channel occupancy time, and the frequency hopping manager 915 may identify the at least one set of interleaved frequency resources for the time interval based on the frequency hopping pattern.

According to some aspects, the LBT manager 910 may receive an indication of gaps in the time interval allocated for the first UE to perform a listen-before-talk procedure. According to some aspects, the LBT manager 910 may initiate the listen-before-talk procedure in at least one of the indicated gaps to gain access to the shared radio frequency spectrum band to transmit the sidelink data based on the receiving. In some cases, a respective set of interleaved frequency resources reserved by the second UE for sidelink communications in each time interval of the set of contiguous time intervals is based on a subcarrier spacing of the time interval, a sidelink identification (ID) of the second UE, a resource pool ID of the respective set of interleaved frequency resources, higher layer parameters to enable or disable group hopping, or a combination thereof.

According to some aspects, the shared spectrum manager 930 may identify that a second UE has reserved a shared radio frequency spectrum band for sidelink communications in a channel occupancy time, the channel occupancy time spanning a set of contiguous time intervals. The feedback manager 935 may receive a feedback message transmitted by a third UE acknowledging receipt of a transmission of first sidelink data from the second UE. The resource identifier 940 may identify resources reserved for a retransmission of the first sidelink data from the second UE to the third UE. According to some aspects, the LBT manager 910 may initiate a listen-before-talk procedure to gain access to the identified resources for at least one interval of the channel occupancy time. According to some aspects, the sidelink manager 920 may transmit, based on a result of the listen-before-talk procedure, second sidelink data to a fourth UE on the identified resources based on receiving the feedback message.

According to some aspects, the control information manager 925 may receive control information indicating that the resources reserved for the retransmission are released upon the third UE acknowledging receipt of the transmission of the first sidelink data. In some cases, the control information further indicates a quantity of slots after receiving the feedback message that the first UE is to wait before transmitting the second sidelink data on the resources reserved for the retransmission. In some cases, the control information further indicates that the first UE is eligible to transmit using the identified resources for the at least one interval of the channel occupancy time. In some cases, the control information includes sidelink control information or downlink control information.

Figure 10:
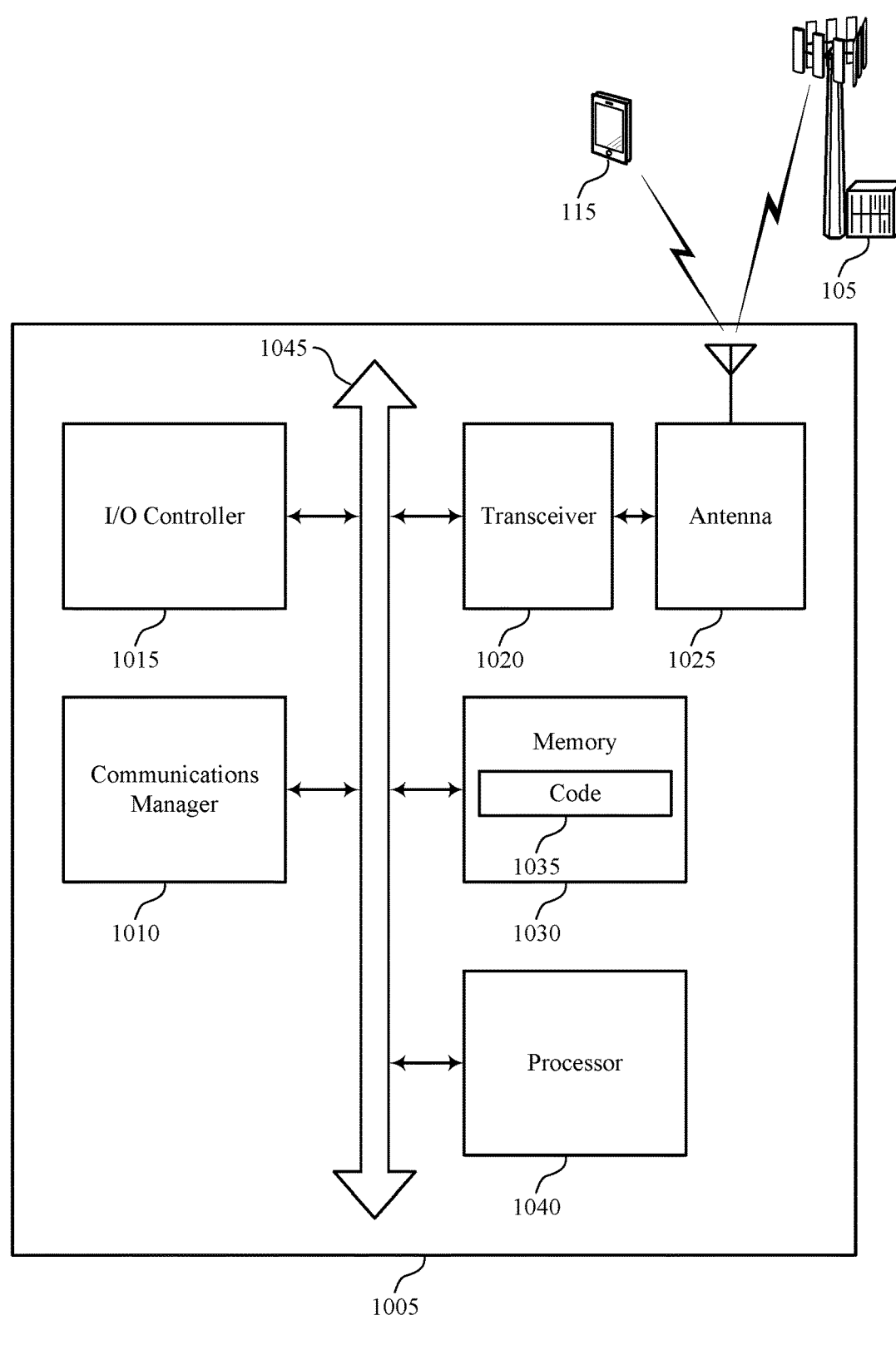
FIG. 10 shows a diagram of a system including a device that supports resource configuration and reservation for sidelink communications in accordance with aspects of the present disclosure.

FIG. 10 shows a diagram of a system 1000 including a device 1005 that supports resource configuration and reservation for sidelink communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may perform a listen-before-talk procedure to gain access to a shared radio frequency spectrum band for a channel occupancy time to transmit sidelink data to a second UE, the channel occupancy time spanning a set of contiguous time intervals, identify a frequency hopping pattern including a first set of interleaved frequency resources for transmitting the sidelink data in a first time interval of the set of contiguous time intervals and a second set of interleaved frequency resources for transmitting the sidelink data in a second time interval of the set of contiguous time intervals, and transmit, to the second UE, the sidelink data on the first set of interleaved frequency resources in the first time interval and the second set of interleaved frequency resources in the second time interval based on the frequency hopping pattern.

The communications manager 1010 may also identify that a second UE has reserved a shared radio frequency spectrum band for sidelink communications in a channel occupancy time, the channel occupancy time spanning a set of contiguous time intervals, receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns, and transmit, to a third UE, sidelink data in the time interval on the at least one set of interleaved frequency resources.

The communications manager 1010 may also identify that a second UE has reserved a shared radio frequency spectrum band for sidelink communications in a channel occupancy time, the channel occupancy time spanning a set of contiguous time intervals, receive a feedback message transmitted by a third UE acknowledging receipt of a transmission of first sidelink data from the second UE, identify resources reserved for a retransmission of the first sidelink data from the second UE to the third UE, initiate a listen-before-talk procedure to gain access to the identified resources for at least one interval of the channel occupancy time, and transmit, based on a result of the listen-before-talk procedure, second sidelink data to a fourth UE on the identified resources based on receiving the feedback message.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WIN- DOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. According to some aspects, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource configuration and reservation for sidelink communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

FIG. 11 shows a flowchart illustrating a method 1100 that supports resource configuration and reservation for sidelink communications in accordance with aspects of the present disclosure. The operations of method 1100 may be implemented by a UE 115 or its components as described herein. According to some aspects, the operations of method 1100 may be performed by a communications manager as described with reference to FIGS. 7 through 10. According to some aspects, a UE may execute a set of instructions to control the functional elements of the UE to perform the functions described below. Additionally, or alternatively, a UE may perform aspects of the functions described below using special-purpose hardware.

At 1105, the UE may identify a resource pool configuration indicating resources in a shared radio frequency spectrum available to the first UE for sidelink communications, the resources comprising a plurality of contiguous time intervals. For example, the UE may receive the resource pool configuration from a base station (e.g., via RRC signaling). The operations of 1105 may be performed according to the methods described herein. According to some aspects, aspects of the operations of 1105 may be performed by a sidelink manager as described with reference to FIGS. 7 through 10.

At 1110, the UE may identify a frequency hopping pattern including a first set of interleaved frequency resources for transmitting sidelink data in a first time interval of the set of contiguous time intervals and a second set of interleaved frequency resources for transmitting the sidelink data in a second time interval of the set of contiguous time intervals. The operations of 1110 may be performed according to the methods described herein. According to some aspects, aspects of the operations of 1110 may be performed by a frequency hopping manager as described with reference to FIGS. 7 through 10.

At 1115, the UE may transmit, to a second UE, the sidelink data on the first set of interleaved frequency resources in the first time interval and the second set of interleaved frequency resources in the second time interval based on the frequency hopping pattern. The operations of 1115 may be performed according to the methods described herein. According to some aspects, aspects of the operations of 1115 may be performed by a sidelink manager as described with reference to FIGS. 7 through 10.

FIG. 12 shows a flowchart illustrating a method 1200 that supports resource configuration and reservation for sidelink communications in accordance with aspects of the present disclosure. The operations of method 1200 may be implemented by a UE 115 or its components as described herein. According to some aspects, the operations of method 1200 may be performed by a communications manager as described with reference to FIGS. 7 through 10. According to some aspects, a UE may execute a set of instructions to control the functional elements of the UE to perform the functions described below. Additionally, or alternatively, a UE may perform aspects of the functions described below using special-purpose hardware.

At 1205, the UE may identify that a second UE has reserved a shared radio frequency spectrum band for sidelink communications in a channel occupancy time, the channel occupancy time spanning a set of contiguous time intervals. The operations of 1205 may be performed according to the methods described herein. According to some aspects, aspects of the operations of 1205 may be performed by a shared spectrum manager as described with reference to FIGS. 7 through 10.

At 1210, the UE may receive control information indicating at least one set of interleaved frequency resources that is available for a time interval of the set of contiguous time intervals, the at least one set of interleaved frequency resources being one of a set of sets of interleaved frequency resources that frequency hop between time intervals based on respective frequency hopping patterns. The operations of 1210 may be performed according to the methods described herein. According to some aspects, aspects of the operations of 1210 may be performed by a frequency hopping manager as described with reference to FIGS. 7 through 10.

At 1215, the UE may transmit, to a third UE, sidelink data in the time interval on the at least one set of interleaved frequency resources. The operations of 1215 may be performed according to the methods described herein. According to some aspects, aspects of the operations of 1215 may be performed by a sidelink manager as described with reference to FIGS. 7 through 10.

FIG. 13 shows a flowchart illustrating a method 1300 that supports resource configuration and reservation for sidelink communications in accordance with aspects of the present disclosure. The operations of method 1300 may be implemented by a UE 115 or its components as described herein. According to some aspects, the operations of method 1300 may be performed by a communications manager as described with reference to FIGS. 7 through 10. According to some aspects, a UE may execute a set of instructions to control the functional elements of the UE to perform the functions described below. Additionally, or alternatively, a UE may perform aspects of the functions described below using special-purpose hardware.

At 1305, the UE may identify that a second UE has reserved a shared radio frequency spectrum band for sidelink communications in a channel occupancy time, the channel occupancy time spanning a set of contiguous time intervals. The operations of 1305 may be performed according to the methods described herein. According to some aspects, aspects of the operations of 1305 may be performed by a shared spectrum manager as described with reference to FIGS. 7 through 10.

At 1310, the UE may receive a feedback message transmitted by a third UE acknowledging receipt of a transmission of first sidelink data from the second UE. The operations of 1310 may be performed according to the methods described herein. According to some aspects, aspects of the operations of 1310 may be performed by a feedback manager as described with reference to FIGS. 7 through 10.

At 1315, the UE may identify resources reserved for a retransmission of the first sidelink data from the second UE to the third UE. The operations of 1315 may be performed according to the methods described herein. According to some aspects, aspects of the operations of 1315 may be performed by a resource identifier as described with reference to FIGS. 7 through 10.

At 1320, the UE may initiate a listen-before-talk procedure to gain access to the identified resources for at least one interval of the channel occupancy time. The operations of 1320 may be performed according to the methods described herein. According to some aspects, aspects of the operations of 1320 may be performed by a LBT manager as described with reference to FIGS. 7 through 10.

At 1325, the UE may transmit, based on a result of the listen-before-talk procedure, second sidelink data to a fourth UE on the identified resources based on receiving the feedback message. The operations of 1325 may be performed according to the methods described herein. According to some aspects, aspects of the operations of 1325 may be performed by a sidelink manager as described with reference to FIGS. 7 through 10.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein.

Example 1: A method for wireless communication implemented by a first UE, comprising: identifying a resource pool configuration indicating resources in a shared radio frequency spectrum band available to the first UE for sidelink communications, the resources comprising a plurality of contiguous time intervals; identifying a frequency hopping pattern comprising a first set of interleaved frequency resources for transmitting sidelink data in a first time interval of the plurality of contiguous time intervals and a second set of interleaved frequency resources for transmitting the sidelink data in a second time interval of the plurality of contiguous time intervals; and transmitting, to a second UE, the sidelink data on the first set of interleaved frequency resources in the first time interval and the second set of interleaved frequency resources in the second time interval based at least in part on the frequency hopping pattern.

Example 2: The method of example 1, further comprising: performing a listen-before-talk procedure to gain access to the shared radio frequency spectrum band for a channel occupancy time to transmit the sidelink data to the second UE, the channel occupancy time spanning at least the first time interval and the second time interval of the plurality of contiguous time intervals.

Example 3: The method of examples 1 and 2, further comprising: receiving control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

Example 4: The method of examples 1 through 3, further comprising: transmitting, in the first time interval, an indication of the first set of interleaved frequency resources used for transmitting the sidelink data in the first time interval; and transmitting, in the second time interval, an indication of the second set of interleaved frequency resources used for transmitting the sidelink data in the second time interval.

Example 5: The method of examples 1 through 4, further comprising: transmitting, in the first time interval, an indication of the second set of interleaved frequency resources used for transmitting the sidelink data in the second time interval.

Example 6: The method of examples 1 through 5, further comprising: transmitting, in the first time interval, the second time interval, or both, an indication of the frequency hopping pattern used by the first UE to transmit the sidelink data on the first set of interleaved frequency resources in the first time interval and on the second set of interleaved frequency resources in the second time interval.

Example 7: The method of examples 1 through 6, further comprising: transmitting an indication of gaps in the first time interval, the second time interval, or both, allocated for other UEs to perform listen-before-talk procedures to gain access to the shared radio frequency spectrum band.

Example 8: The method of examples 1 through 7, wherein: respective sets of interleaved frequency resources available to the first UE for sidelink communications in each time interval of the plurality of contiguous time intervals are based at least in part on a subcarrier spacing of the time interval, a sidelink identification (ID) of the first UE, a resource pool ID of the respective set of interleaved frequency resources, one or more parameters associated with group hopping of frequency resources, or a combination thereof.

Example 9: A method for wireless communication implemented by a first UE, comprising: identifying that a second UE has reserved a shared radio frequency spectrum band for sidelink communications in a channel occupancy time, the channel occupancy time spanning a plurality of contiguous time intervals; receiving a feedback message transmitted by a third UE acknowledging receipt of a transmission of first sidelink data from the second UE; identifying resources reserved for a retransmission of the first sidelink data from the second UE to the third UE; initiating a listen-before-talk procedure to gain access to the identified resources for at least one interval of the channel occupancy time; and transmitting, based at least in part on a result of the listen-before-talk procedure, second sidelink data to a fourth UE on the identified resources based at least in part on receiving the feedback message.

Example 10: The method of example 9, further comprising: receiving control information indicating that the resources reserved for the retransmission are released upon the third UE acknowledging receipt of the transmission of the first sidelink data.

Example 11: The method of examples 9 and 10, wherein the control information further indicates a quantity of slots after receiving the feedback message that the first UE is to wait before transmitting the second sidelink data on the resources reserved for the retransmission.

Example 12: The method of examples 9 through 11, wherein the control information further indicates that the first UE is eligible to transmit using the identified resources for the at least one interval of the channel occupancy time.

Example 13: The method of examples 9 through 12, wherein the control information comprises sidelink control information or downlink control information.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. According to some aspects, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. According to some aspects, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a first user equipment (UE), comprising:

identifying a resource pool configuration indicating resources in a shared radio frequency spectrum band available to the first UE for sidelink communications, the resources comprising a plurality of contiguous time intervals;

performing a listen-before-talk procedure to gain access to the shared radio frequency spectrum band for a channel occupancy time to transmit sidelink data to a second UE, the channel occupancy time spanning at least a first time interval and a second time interval of the plurality of contiguous time intervals;

identifying a frequency hopping pattern comprising a first set of interleaved frequency resources for transmitting the sidelink data in the first time interval of the plurality of contiguous time intervals and a second set of interleaved frequency resources for transmitting the sidelink data in the second time interval of the plurality of contiguous time intervals; and transmitting, to the second UE, the sidelink data on the first set of interleaved frequency resources in the first time interval and the second set of interleaved frequency resources in the second time interval based at least in part on the frequency hopping pattern.

2. The method of claim 1, further comprising:

receiving control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

3. The method of claim 1, further comprising:

transmitting, in the first time interval, an indication of the first set of interleaved frequency resources used for transmitting the sidelink data in the first time interval; and transmitting, in the second time interval, an indication of the second set of interleaved frequency resources used for transmitting the sidelink data in the second time interval.

4. The method of claim 1, further comprising:

transmitting, in the first time interval, an indication of the second set of interleaved frequency resources used for transmitting the sidelink data in the second time interval.

5. A method for wireless communication implemented by a first user equipment (UE), comprising:

identifying a resource pool configuration indicating resources in a shared radio frequency spectrum band available to the first UE for sidelink communications, the resources comprising a plurality of contiguous time intervals;

identifying a frequency hopping pattern comprising a first set of interleaved frequency resources for transmitting sidelink data in a first time interval of the plurality of contiguous time intervals and a second set of interleaved frequency resources for transmitting the sidelink data in a second time interval of the plurality of contiguous time intervals;

transmitting, to a second UE, the sidelink data on the first set of interleaved frequency resources in the first time interval and the second set of interleaved frequency resources in the second time interval based at least in part on the frequency hopping pattern; and transmitting, in the first time interval, the second time interval, or both, an indication of the frequency hopping pattern used by the first UE to transmit the sidelink data on the first set of interleaved frequency resources in the first time interval and on the second set of interleaved frequency resources in the second time interval.

6. The method of claim 1, further comprising:

transmitting an indication of gaps in the first time interval, the second time interval, or both, allocated for other UEs to perform listen-before-talk procedures to gain access to the shared radio frequency spectrum band.

7. The method of claim 1, wherein:

respective sets of interleaved frequency resources available to the first UE for sidelink communications in each time interval of the plurality of contiguous time intervals are based at least in part on a subcarrier spacing of a respective time interval, a sidelink identification (ID) of the first UE, a resource pool ID of a respective set of interleaved frequency resources, one or more parameters associated with group hopping of frequency resources, or a combination thereof.

8. An apparatus for wireless communication at a first user equipment (UE), comprising:

one or more processors; and memory coupled with the one or more processors, wherein the memory comprises instructions executable by the one or more processors to cause the apparatus to:

receive a resource pool configuration indicating resources in a shared radio frequency spectrum band available to the first UE for sidelink communications, the resources comprising a plurality of contiguous time intervals;

perform a listen-before-talk procedure to gain access to the shared radio frequency spectrum band for a channel occupancy time to transmit sidelink data to a second UE, the channel occupancy time spanning at least a first time interval and a second time interval of the plurality of contiguous time intervals;

identify a frequency hopping pattern comprising a first set of interleaved frequency resources for transmitting the sidelink data in the first time interval of the plurality of contiguous time intervals and a second set of interleaved frequency resources for transmitting the sidelink data in the second time interval of the plurality of contiguous time intervals; and transmit, to the second UE, the sidelink data on the first set of interleaved frequency resources in the first time interval and the second set of interleaved frequency resources in the second time interval based at least in part on the frequency hopping pattern.

9. The apparatus of claim 8, wherein the instructions are further executable by the one or more processors to cause the apparatus to:

receive control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

10. The apparatus of claim 8, wherein the instructions are further executable by the one or more processors to cause the apparatus to:

transmit, in the first time interval, an indication of the first set of interleaved frequency resources used for transmitting the sidelink data in the first time interval; and transmit, in the second time interval, an indication of the second set of interleaved frequency resources used for transmitting the sidelink data in the second time interval.

11. The apparatus of claim 8, wherein the instructions are further executable by the one or more processors to cause the apparatus to:

transmit, in the first time interval, an indication of the second set of interleaved frequency resources used for transmitting the sidelink data in the second time interval.

12. An apparatus for wireless communication at a first user equipment (UE), comprising:

one or more processors; and memory coupled with the one or more processors, wherein the memory comprises instructions executable by the one or more processors to cause the apparatus to:

receive a resource pool configuration indicating resources in a shared radio frequency spectrum band available to the first UE for sidelink communications, the resources comprising a plurality of contiguous time intervals;

identify a frequency hopping pattern comprising a first set of interleaved frequency resources for transmitting sidelink data in a first time interval of the plurality of contiguous time intervals and a second set of interleaved frequency resources for transmitting the sidelink data in a second time interval of the plurality of contiguous time intervals;

transmit, to a second UE, the sidelink data on the first set of interleaved frequency resources in the first time interval and the second set of interleaved frequency resources in the second time interval based at least in part on the frequency hopping pattern; and transmit, in the first time interval, the second time interval, or both, an indication of the frequency hopping pattern used by the first UE to transmit the sidelink data on the first set of interleaved frequency resources in the first time interval and on the second set of interleaved frequency resources in the second time interval.

13. The apparatus of claim 8, wherein the instructions are further executable by the one or more processors to cause the apparatus to:

transmit an indication of gaps in the first time interval, the second time interval, or both, allocated for other UEs to perform listen-before-talk procedures to gain access to the shared radio frequency spectrum band.

14. The apparatus of claim 8, wherein respective sets of interleaved frequency resources available to the first UE for sidelink communications in each time interval of the plurality of contiguous time intervals are based at least in part on a subcarrier spacing of a respective the time interval, a sidelink identification (ID) of the first UE, a resource pool ID of a respective set of interleaved frequency resources, one or more parameters associated with group hopping of frequency resources, or a combination thereof.

15. An apparatus for wireless communication implemented by a first user equipment (UE), comprising:

means for identifying a resource pool configuration indicating resources in a shared radio frequency spectrum band available to the first UE for sidelink communications, the resources comprising a plurality of contiguous time intervals;

means for performing a listen-before-talk procedure to gain access to the shared radio frequency spectrum band for a channel occupancy time to transmit sidelink data to a second UE, the channel occupancy time spanning at least a first time interval and a second time interval of the plurality of contiguous time intervals;

means for identifying a frequency hopping pattern comprising a first set of interleaved frequency resources for transmitting the sidelink data in the first time interval of the plurality of contiguous time intervals and a second set of interleaved frequency resources for transmitting the sidelink data in the second time interval of the plurality of contiguous time intervals; and means for transmitting, to the second UE, the sidelink data on the first set of interleaved frequency resources in the first time interval and the second set of interleaved frequency resources in the second time interval based at least in part on the frequency hopping pattern.

16. The apparatus of claim 15, further comprising:

means for receiving control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

17. The apparatus of claim 15, further comprising:

means for transmitting, in the first time interval, an indication of the first set of interleaved frequency resources used for transmitting the sidelink data in the first time interval; and means for transmitting, in the second time interval, an indication of the second set of interleaved frequency resources used for transmitting the sidelink data in the second time interval.

18. The apparatus of claim 15, further comprising:

means for transmitting, in the first time interval, an indication of the second set of interleaved frequency resources used for transmitting the sidelink data in the second time interval.

19. An apparatus for wireless communication implemented by a first user equipment (UE), comprising means for identifying a resource pool configuration indicating resources in a shared radio frequency spectrum band available to the first UE for sidelink communications, the resources comprising a plurality of contiguous time intervals;

means for identifying a frequency hopping pattern comprising a first set of interleaved frequency resources for transmitting sidelink data in a first time interval of the plurality of contiguous time intervals and a second set of interleaved frequency resources for transmitting the sidelink data in a second time interval of the plurality of contiguous time intervals;

means for transmitting, to a second UE, the sidelink data on the first set of interleaved frequency resources in the first time interval and the second set of interleaved frequency resources in the second time interval based at least in part on the frequency hopping pattern; and means for transmitting, in the first time interval, the second time interval, or both, an indication of the frequency hopping pattern used by the first UE to transmit the sidelink data on the first set of interleaved frequency resources in the first time interval and on the second set of interleaved frequency resources in the second time interval.

20. The apparatus of claim 15, further comprising:

means for transmitting an indication of gaps in the first time interval, the second time interval, or both, allocated for other UEs to perform listen-before-talk procedures to gain access to the shared radio frequency spectrum band.

21. The apparatus of claim 15, wherein respective sets of interleaved frequency resources available to the first UE for sidelink communications in each time interval of the plurality of contiguous time intervals are based at least in part on a subcarrier spacing of a respective time interval, a sidelink identification (ID) of the first UE, a resource pool ID of a respective set of interleaved frequency resources, one or more parameters associated with group hopping of frequency resources, or a combination thereof.

22. A non-transitory computer-readable medium storing code for wireless communication implemented by a first user equipment (UE), the code comprising instructions executable by one or more processors to:

identify a resource pool configuration indicating resources in a shared radio frequency spectrum band available to the first UE for sidelink communications, the resources comprising a plurality of contiguous time intervals;

perform a listen-before-talk procedure to gain access to the shared radio frequency spectrum band for a channel occupancy time to transmit sidelink data to a second UE, the channel occupancy time spanning at least a first time interval and a second time interval of the plurality of contiguous time intervals;

identify a frequency hopping pattern comprising a first set of interleaved frequency resources for transmitting the sidelink data in the first time interval of the plurality of contiguous time intervals and a second set of interleaved frequency resources for transmitting the sidelink data in the second time interval of the plurality of contiguous time intervals; and transmit, to the second UE, the sidelink data on the first set of interleaved frequency resources in the first time interval and the second set of interleaved frequency resources in the second time interval based at least in part on the frequency hopping pattern.

23. The non-transitory computer-readable medium of claim 22, wherein the instructions are further executable by the one or more processors to:

receive control information indicating at least one set of interleaved frequency resources that is available for each time interval of the plurality of contiguous time intervals, wherein identifying the frequency hopping pattern comprising the first set of interleaved frequency resources in the first time interval and the second set of interleaved frequency resources in the second time interval is based at least in part on receiving the control information.

24. The non-transitory computer-readable medium of claim 22, wherein the instructions are further executable by the one or more processors to:

transmit, in the first time interval, an indication of the first set of interleaved frequency resources used for transmitting the sidelink data in the first time interval; and transmit, in the second time interval, an indication of the second set of interleaved frequency resources used for transmitting the sidelink data in the second time interval.

25. The non-transitory computer-readable medium of claim 22, wherein the instructions are further executable by the one or more processors to:

transmit, in the first time interval, an indication of the second set of interleaved frequency resources used for transmitting the sidelink data in the second time interval.

26. A non-transitory computer-readable medium storing code for wireless communication implemented by a first user equipment (UE), the code comprising instructions executable by one or more processors to:

identify a resource pool configuration indicating resources in a shared radio frequency spectrum band available to the first UE for sidelink communications, the resources comprising a plurality of contiguous time intervals;

identify a frequency hopping pattern comprising a first set of interleaved frequency resources for transmitting sidelink data in a first time interval of the plurality of contiguous time intervals and a second set of interleaved frequency resources for transmitting the sidelink data in a second time interval of the plurality of contiguous time intervals;

transmit, to a second UE, the sidelink data on the first set of interleaved frequency resources in the first time interval and the second set of interleaved frequency resources in the second time interval based at least in part on the frequency hopping pattern; and transmit, in the first time interval, the second time interval, or both, an indication of the frequency hopping pattern used by the first UE to transmit the sidelink data on the first set of interleaved frequency resources in the first time interval and on the second set of interleaved frequency resources in the second time interval.

* * * * *